US007016746B2

(12) United States Patent
Wiser et al.

(10) Patent No.: US 7,016,746 B2
(45) Date of Patent: *Mar. 21, 2006

(54) DIGITAL AUDIO SIGNAL FILTERING MECHANISM AND METHOD

(75) Inventors: Philip R. Wiser, Redwood City, CA (US); Leeann Heringer, Redwood City, CA (US); Gerry Kearby, Redwood City, CA (US); Leon Rishniw, Redwood City, CA (US); Jason Brownell, Redwood City, CA (US)

(73) Assignee: Microsoft Corporation, Redmond, WA (US)

( * ) Notice: Subject to any disclaimer, the term of this patent is extended or adjusted under 35 U.S.C. 154(b) by 581 days.

This patent is subject to a terminal disclaimer.

(21) Appl. No.: 10/147,746

(22) Filed: May 16, 2002

(65) Prior Publication Data

US 2003/0009247 A1    Jan. 9, 2003

Related U.S. Application Data

(63) Continuation of application No. 08/966,072, filed on Nov. 7, 1997.

(51) Int. Cl.
*H04R 5/00* (2006.01)
(52) U.S. Cl. .......................................... 700/94; 381/23
(58) Field of Classification Search ................ 709/217, 709/219; 381/98, 103, 23; 700/94
See application file for complete search history.

(56) References Cited

U.S. PATENT DOCUMENTS

| 5,055,939 A | 10/1991 | Karamon et al. |
| 5,418,713 A | 5/1995 | Allen .......................... 364/403 |
| 5,576,843 A | 11/1996 | Cookson et al. |
| 5,636,276 A | 6/1997 | Brugger ........................ 380/4 |
| 5,734,823 A | 3/1998 | Saigh et al. ........... 395/200.06 |
| 5,734,891 A | 3/1998 | Saigh ........................ 395/610 |
| 5,794,217 A | 8/1998 | Allen .......................... 705/27 |
| 5,805,715 A | 9/1998 | Rhee .......................... 381/98 |
| 5,895,124 A | 4/1999 | Tsuga et al. |
| 5,928,330 A | 7/1999 | Goetz et al. ................. 709/231 |
| 5,953,506 A | 9/1999 | Kalra et al. |
| 5,996,022 A | 11/1999 | Krueger et al. |
| 6,078,669 A | 6/2000 | Maher |
| 6,185,625 B1 | 2/2001 | Tso et al. |
| 6,263,505 B1 | 7/2001 | Walker et al. |
| 6,341,166 B1 | 1/2002 | Basel ........................ 381/103 |
| 6,393,198 B1 | 5/2002 | LaMacchia |
| 6,704,421 B1 * | 3/2004 | Kitamura .................... 381/103 |
| 2003/0191548 A1 * | 10/2003 | McPherson et al. .......... 700/94 |

OTHER PUBLICATIONS

Digital Audio Compression Standard (AC-3), Dec. 20, 1995, Advanced Television Systems Committee, ATSC Standard.

* cited by examiner

*Primary Examiner*—Brian T. Pendleton
(74) *Attorney, Agent, or Firm*—Klarquist Sparkman, LLP

(57) ABSTRACT

Essentially all of the processing parameters which control processing of a source audio signal to produce an encoded audio signal are stored in an audio processing profile. Multiple audio processing profiles are stored in a processing profile database such that specific combinations of processing parameters can be retrieved and used at a later time. Audio processing profiles are organized according to specific delivery bandwidths such that a sound engineer can quickly and efficiently encode audio signals for each of a number of distinct delivery media. Synchronized A/B switching during playback of various encoded audio signals allows the sound engineer to detect nuances in the sound characteristics of the various encoded audio signals.

12 Claims, 17 Drawing Sheets

EQUALIZATION PARAMETERS 406

| INPUT GAIN 502 | | | |
|---|---|---|---|
| TYPE 504A | FREQ 506A | GAIN 508A | Q 510A |
| TYPE 504B | FREQ 506B | GAIN 508B | Q 510B |
| TYPE 504C | FREQ 506C | GAIN 508C | Q 510C |
| TYPE 504D | FREQ 506D | GAIN 508D | Q 510D |
| BYPASS 512 | | | |

504A → (INPUT GAIN 502 row)
504B → TYPE 504A
504C → TYPE 504B
504D → TYPE 504C, TYPE 504D

FIGURE 5

DYNAMIC FILTERING PARAMETERS 408

| BYPASS 602 |
|---|
| STEREO LINK 604 |
| ATTACK TIME 606 |
| RELEASE TIME 608 |
| EXPANDER RATIO 610 |
| EXPANDER THRESHOLD 612 |
| COMPRESSOR RATIO 614 |
| COMPRESSOR THRESHOLD 616 |
| LIMITER THRESHOLD 618 |
| OUTPUT GAIN 620 |
| OUTPUT GAIN MAKEUP 622 |

FIGURE 6

ENCODING PARAMETERS 412

| |
|---|
| DATA RATE 1802 |
| COMPRESSION 1804 |
| LA OPTIMIZATION 1806 |
| QUALITY 1808 |
| AUX. DATA LENGTH 1810 |
| BANDWIDTH 1812 |
| CHANNEL COUPLING 1814 |
| COUPLING FREQUENCY 1816 |
| VERBOSE MODE 1818 |
| BANDWIDTH FILTER 1820 |
| LFE FILTER 1822 |
| LFE CHANNEL 1824 |
| DC FILTER 1826 |
| PHASE SHIFT 1828 |
| DE-EMPHASIS 1830 |

FIGURE 18

WATERMARK PARAMETERS 410

| |
|---|
| BYPASS 1902 |
| QUALITY 1904 |
| FIDELITY 1906 |

FIGURE 19

MARK 1006

| SONG/CLIP 2102 |
| --- |
| START POSITION 2104 |
| STOP POSITION 2106 |

FIGURE 21

FADE 1008

| FADE-IN 2202 |
| --- |
| FADE-OUT 2204 |

FIGURE 22

DIGITAL AUDIO SIGNAL FILTERING MECHANISM AND METHOD

SPECIFICATION

This is a continuation application of U.S. patent application Ser. No. 08/966,072 filed Nov. 7, 1997.

FIELD OF THE INVENTION

The present invention relates to computer filtering of digital audio signals and, in particular, to a particularly useful user interface for computer filtering of digital audio signals for delivery through various types of signal delivery media in a computer network.

BACKGROUND OF THE INVENTION

Audio signals stored in digital form have been in use for decades; however, distribution of such digital audio signals has generally been limited to physical distribution of tangible storage media in which the digital audio signals are encoded. Examples include compact discs (CDs) and digital audio tape (DAT) which store audio signals representing, for example, pre-recorded music, spoken word recordings, and sound effects. Recently, wide area computer networks such as the Internet have experienced tremendous growth in use and popularity. Accordingly, direct delivery of digital audio signals through such a wide area network has become an alternative to, and threatens to replace, physical delivery of tangible storage media as the primary delivery mode of digital audio signals.

Many digital audio signal filtering systems are currently available. Many such systems are used, for example, in producing a "master" signal in which various component signals, e.g., each from a separate musical instrument, are filtered and mixed such that the resulting master signal represents the artistic creation of an artist or collection of collaborating artists. This master signal is what is typically fixed in the tangible storage media which is physically distributed to the consuming public.

In direct delivery of digital audio signals through wide-area computer networks, the master signal can be sent directly to the computer system of a consumer. The master signal can be played directly from the consumer's computer system through a sound card and attached loudspeakers or can be stored on a tangible storage medium, e.g., writeable CD-ROM, for playback using conventional CD players and analog stereo equipment. Since the master signal is digital and is the same master signal which would traditionally be stored in tangible storage media by the producer, the master signal received by the consumer through the wide-area computer network is of the same quality as the master signal physically distributed on tangible storage media.

Sometimes, samples of the master signal are made available to the consumer through the computer network for preview purposes. Such samples are frequently streamed, i.e., delivered to a client computer system while the client computer system decodes and plays the received digital audio signals in real time. Because of variations in bandwidth with which various client computer systems are attached to computer networks such as the Internet, such samples are frequently delivered through low bandwidth communications media which are incapable of real-time delivery of such digital audio signals in a native, un-compressed form. Accordingly, the digital audio signal is generally compressed and encoded to reduce the amount of data required to represent the digital audio signal. The digital audio signal can be transmitted through computer network media in less time, requiring less bandwidth, than would ordinarily be required to transmit the digital audio signal in its native, un-encoded form. However, compression of the digital audio signal usually results in loss of detail of the digital audio signal such that sound quality of a received, decoded digital audio signal is typically degraded from the sound quality of the original digital audio signal prior to encoding and delivery through a computer network.

To mitigate the loss of signal quality as a result of such compression or to reduce some of the annoying effects of such compression, some sound engineers apply filters to a digital audio signal to enhance the result of compressing and encoding the digital audio signal. For example, in certain circumstances, emphasizing certain frequencies while de-emphasizing other frequencies of a digital audio signal prior to compression and encoding produces an encoded digital audio signal which has a more pleasant sound when decoded and played back relative to the sound of playback of a digital audio signal which is not filtered prior to such encoding. However, finding a particularly good combination of filters and encoders for a particular digital audio signal typically requires application of different filters from different suppliers and iterative application of such filters with various encoders to find an optimal combination. Furthermore, once a good combination of filters and encoders is determined for a particular digital audio signal, the combination is often not the best combination for a different digital audio signal and the entire empirical selection of a good combination of filters and encoders must generally be repeated for the different digital audio signal.

In addition, when distributing digital audio signals through a wide area computer network, it is sometimes desirable to deliver the digital audio signal within a particular amount of time. Such is desirable when streaming digital audio signals for real time playback. In such circumstances, the encoding of the digital audio signal should be tailored to the particular bandwidth of the network communications media connecting a particular recipient computer system with a source computer system within the computer network. In heterogeneous computer networks, various recipient computer systems can be connected with widely different bandwidths. For example, computer systems connected to the Internet are connected through network media ranging from 14.4 k modems to dedicated T1 connections which have many times the bandwidth of 14.4 k modems. Accordingly, encoding a digital audio signal for one recipient computer system having a particular bandwidth produces an encoded audio signal which is unacceptable for other recipient computer systems. For example, encoding a digital audio signal for real time delivery through a 14.4 k modem produces an encoded audio signal in which signal quality is unnecessarily sacrificed if the encoded signal is delivered to a recipient computer system connected to the source computer system through a dedicated T1 connection. Conversely, encoding a digital audio signal for real time delivery through a dedicated T1 connection produces an encoded audio signal which exceeds the available real-time delivery bandwidth of a recipient computer system connected to the source computer system through a 14.4 k modem.

Further exacerbating the problem is that application of a combination of filters prior to encoding to produce a reasonably good quality encoded audio signal when encoded for a particular delivery bandwidth can produce an encoded audio signal of unacceptable quality when the same combination of filters is applied prior to encoding the digital audio signal for a different delivery bandwidth. Accordingly, a new combination of filters must be empirically determined for each delivery bandwidth for which a digital audio signal is to be encoded. Therefore, the amount of experimentation with various filters and encoders to deliver reasonably high quality signals to recipient computer systems connected through media of differing bandwidths can be overwhelming.

What is needed is a digital audio signal filtering and encoding system which significantly simplifies the processing of digital audio signals for distribution through heterogeneous computer networks through different delivery bandwidths.

SUMMARY OF THE INVENTION

In accordance with the present invention, an audio signal processor filters and encodes a source digital audio signal according to one or more audio processing profiles to produce one or more encoded audio signals. The audio signal processor includes an audio signal processing pipeline which performs all pre-processing, filtering, and encoding of the source audio signal to form each of the encoded audio signals. Each audio processing profile includes data specifying parameters of the pre-processing, filtering, and encoding. Thus, a single audio processing profile specifies all steps in processing the source audio signal to form an encoded audio signal.

The audio processing profiles for a particular source audio signal are organized according to specific delivery bandwidths. For example, one or more audio processing profiles are stored in a collection of audio processing profiles associated with a delivery bandwidth of 14.4 kbps. Other audio processing profiles are stored in collections of audio processing profiles associated with delivery bandwidths of 28.8 kbps, single-channel ISDN, dual-channel ISDN, and non-real time delivery. Non-real time delivery is generally not constrained by the bandwidth of a delivery medium. By organizing audio processing profiles according to associated delivery bandwidth, a sound engineer can empirically determine, and store for subsequent re-use, audio processing profiles which specify particularly good combinations of pre-processing, filtering, and encoding parameters for each of a number of different delivery bandwidths. For example, a sound engineer can determine that a specific combination of pre-processing, filtering, and encoding yields good results for real-time delivery of recordings of a string quartet through a delivery bandwidth of 14.4 kbps and that a different combination of pre-processing, filtering, and encoding yields good results for real-time delivery of recordings of a string quartet through a delivery bandwidth of 28.8 kbps. By storing such audio processing profiles, the sound engineer can quickly process, filter, and encode other recordings of string quartets easily and quickly over both 14.4 kbps and 28.8 kbps delivery media without requiring addition experimentation. A simple name, such as "Strings 14.4" or "Strings 28.8," can be used to identify the complex combination of processing parameters stored in such an audio processing profile and can be thereafter used by the sound engineer as a shorthand notation for that complex combination of processing parameters.

In addition, more than one audio processing profile can be created and stored for a particular delivery bandwidth. Thus, while the sound engineer previously empirically determined a particularly good combination of processing parameters for recordings of a string quartet, the sound engineer can also empirically determine a particular good combination of processing parameters for recordings of operas. The sound engineer can therefore create a number of audio processing profiles for various respective types of sound recording for each delivery bandwidth and store such audio processing profiles for subsequent use to quickly and efficiently process additional digital audio signals of each various type with particularly good results. Furthermore, storage of such audio processing profiles allows a novice sound engineer to process audio signals using audio processing profiles created by other, more experienced sound engineers. In fact, a number of audio processing profiles can be directly programmed into an audio signal processor in accordance with the present invention and such audio processing profiles can therefore be made available to all sound engineers who use the audio signal processor.

Further in accordance with the present invention, the user can control A/B switching of playback of the source audio signal and one or more encoded audio signals. During playback of one audio signal, a graphical user interface receives signals from a user input device in response to physical manipulation by the user. In response thereto, the graphical user interface ceases playback of that audio signal and substantially immediately begins synchronized playback of another audio signal. The two signals can include the source audio signal and any of the encoded signals derived from the source audio signal and therefore have substantially the same sonic content, albeit pre-processed, filtered, and encoded. The playback of the second audio signal is synchronized in that the sonic content of the two audio signals seem uninterrupted to the user who hears the playback even though the general quality and tonal characteristics of the perceived sound will likely change when the playback switches from one to the other audio signal. As a result, a sound engineer can compare two different encoded audio signals formed by pre-processing, filtering, and encoding the source audio signal according to a slightly different set of process parameters stored in the audio processing profile. By switching between playback of the two encoded audio signals, the sound engineer can detect subtle differences in the quality of the sound of the two encoded audio signals and can make very fine adjustments in the processing, filtering, and encoding to achieve very good results. In addition, the sound engineer can compare the encoded audio signal which is the end result of such fine adjustments to the source audio signal using the same A/B switching technique to hear how the encoded audio signal compares to the source audio signal.

Inclusion of many parameters associated with various stages in the pre-processing, filtering, and encoded of the source audio signal facilitates rapid iterative processing of digital audio signals to more quickly achieve a satisfactory combination of pre-processing, filtering, and encoding. Since all stages of audio signal processing, filtering, and encoding affect the quality of the end result, a comprehensive audio processing profile which controls the processing of every stage of the processing pipeline allows the user to change one or more parameters of one or more of the stages and to subsequently cause the processing pipeline to re-process each and every stage of the audio processing in accordance with the new parameters. Thus, a sound engineer can manipulate every step of the processing from the source audio signal to the encoded audio signal at once and can immediately re-process, re-filter, and re-encode the source audio signal in accordance with the changed parameters. Accordingly, the iterative process of empirically determining satisfactory combinations of processing, filtering, and encoding parameters is accelerated.

These features combine to enable sound engineers to quickly and efficiently select combinations of pre-processing, filtering, and encoding parameters that yield particularly good results when encoding various types of digital audio signals for real-time delivery through a variety of delivery bandwidths.

BRIEF DESCRIPTION OF THE DRAWINGS

FIG. 5 is a block diagram of an equalization parameter field of the audio processing profile of FIG. 4.

FIG. 6 is a block diagram of a dynamic filtering parameter field of the audio processing profile of FIG. 4.

FIG. 18 is a screen view of a block diagram of an encoder parameter field of the audio processing profile of FIG. 4.

FIG. 19 is a screen view of a block diagram of a watermark parameter field of the audio processing profile of FIG. 4.

FIG. 21 is a block diagram of a mark field of the encoded audio signal of FIG. 10.

FIG. 22 is a block diagram of a fade field of the encoded audio signal of FIG. 10.

DETAILED DESCRIPTION

Figure 1:
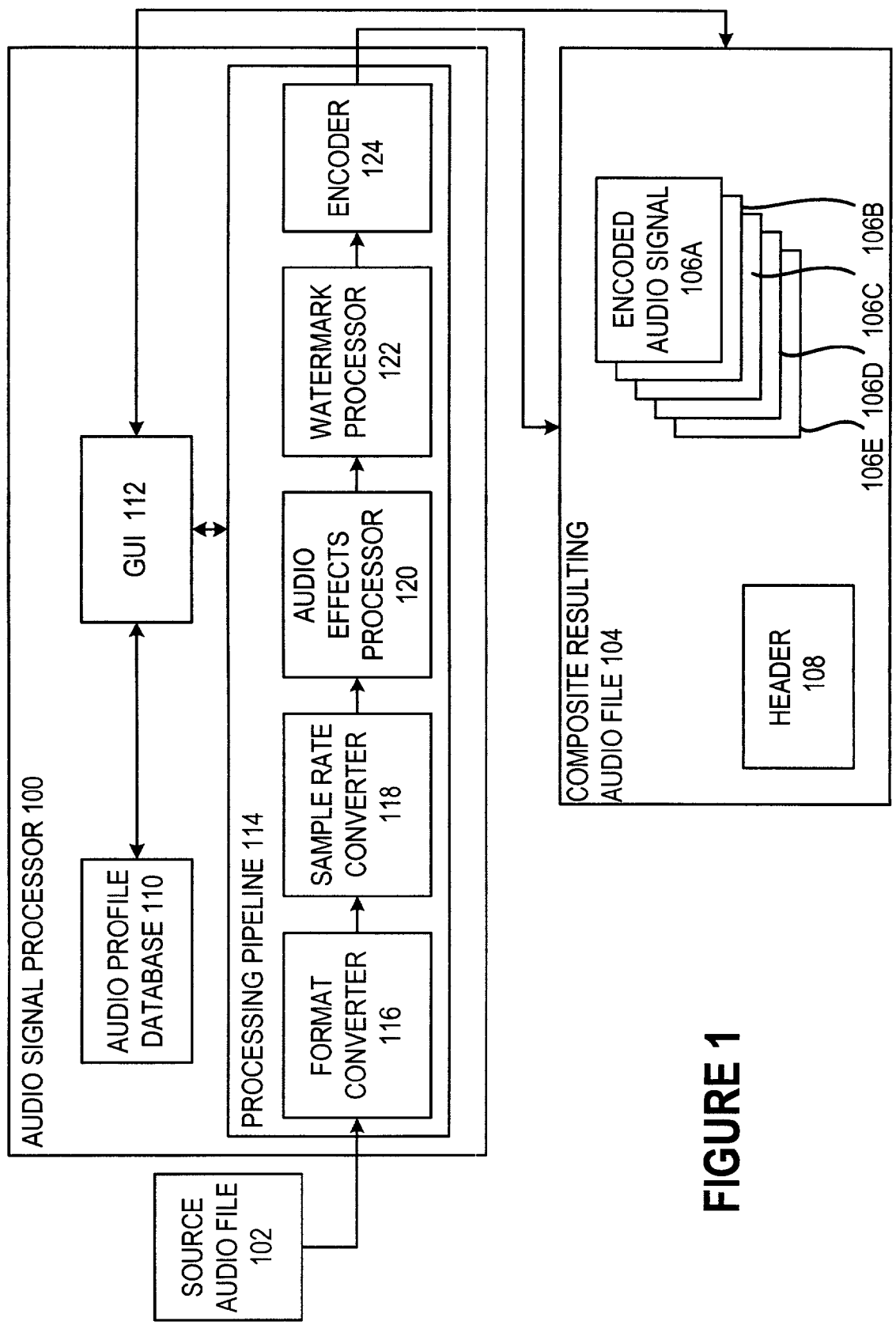
FIG. 1 is a block diagram of an audio signal processor in accordance with the present invention.

In accordance with the present invention, an audio signal processor 100 (FIG. 1) filters and encodes a source audio file 102 according to one or more audio processing profiles to produce a composite resulting audio file 104 which includes one or more encoded audio signals 106A–E. Audio signal processor 100 includes a processing pipeline 114 which performs all pre-processing, filtering, and encoding of source audio file 102 to form composite resulting audio file 104. Specifically, processing pipeline 114 includes a format converter 116, a sample rate converter 118, an audio effects processor 120, a watermark processor 122, and an encoder 124, all of which are described more completely below. Briefly, (i) format converter 116 converts source audio file 102 from a stereo format to a single-channel format and vice versa and can change precision of each sample of source audio file 102; (ii) sample rate converter 118 converts a converted signal received from format converter 116 from the sampling rate of source audio file 102, e.g., 44 kHz, to a different sampling rate specified by a user; (iii) audio effects processor 120 performs various types of signal filtering on the re-sampled signal received from sample rate converter 118, such filtering including input gain, low shelf, band pass, high shelf, expansion, compression, limiting, output gain, reverberation, and stereo imaging filtering; (iv) watermark processor 122 adds encoded identification data to the filtered signal received from signal processor 120; and (v) encoder 124 compresses the watermarked signal received from watermark processor 122 into a standardized format suitable for delivery through a computer network for subsequent decoding and playback.

Each of mono/stereo converter 116, sample rate converter 118, signal processor 120, watermark processor 122, and encoder 124 process received audio signals according to a number of parameters specified by a user. The particular parameters which, when used within processing pipeline 114, produce the best result in terms of sound quality and required delivery bandwidth of each of encoded audio signals 106A–E depends upon the amount of delivery bandwidth available and the nature of the substantive sonic content of source audio file 102. Accordingly, such parameters are represented in a number of audio processing profiles which are stored in audio profile database 110. Audio profile database 110 is shown in greater detail in FIG. 2.

Audio profile database 110 includes a number of profile collections 202A–E, each of which corresponds to a particular delivery bandwidth. For example, profile collections 202A, 202B, 202C, and 202D include audio processing profiles tailored by a user for use with delivery bandwidths of 14.4 kbps, 28.8 kbps, single-channel ISDN, and dual-channel ISDN connections. Profile collection 202E includes audio processing profiles tailored by a user for use with the delivery bandwidth of a T1 or better connection or for non-real-time download delivery in which delivery bandwidth is not a limiting concern. Profile collections 202A–E are analogous to one another. Accordingly, the following description of profile collection 202A is equally applicable to profile collections 202B–E.

Figure 3:
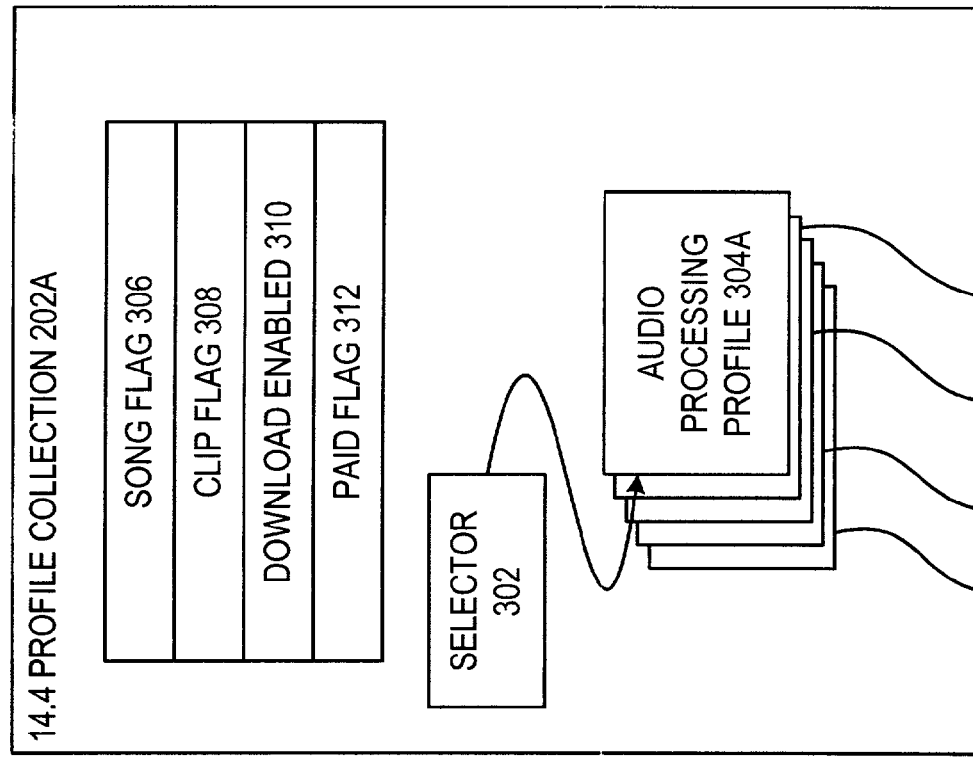
FIG. 3 is a block diagram of a profile collection of the audio profile database of FIG. 2.

Profile collection 202A is shown in greater detail in FIG. 3 and includes a number of audio processing profiles 304A–E and a selector 302. Each of audio processing profiles 304A–E specifies a number of processing parameters which control the processing of source audio file 102 (FIG. 1) by processing pipeline 114. The particular values of processing parameters stored in each of audio processing profiles 304A–E can be selected for processing of a particular type of audio signal. For example, audio processing profile 304A can have processing parameter values selected for optimal processing of classical music such that as much of the balance and clarity of the audio signal is preserved during encoding. Audio processing profile 304B can have processing parameter values selected for optimal processing of grunge music characterized by heavily over-saturated electrical amplification of guitars. Others of audio processing profiles 304A–E can have processing parameter values selected for optimal processing of other types of audio signals including spoken word, jazz music, nature recordings, and sounds in which preservation of stereo channels is more important that the quality of an equivalent single-channel audio signal. Selector 302 contains data which specifies one of audio processing profiles 304A–E as the particular audio processing profile according to which source audio file 102 (FIG. 1) is to be processed for delivery through the delivery bandwidth with which profile collection 202B is associated, e.g., 28.8 kbps.

Figure 4:
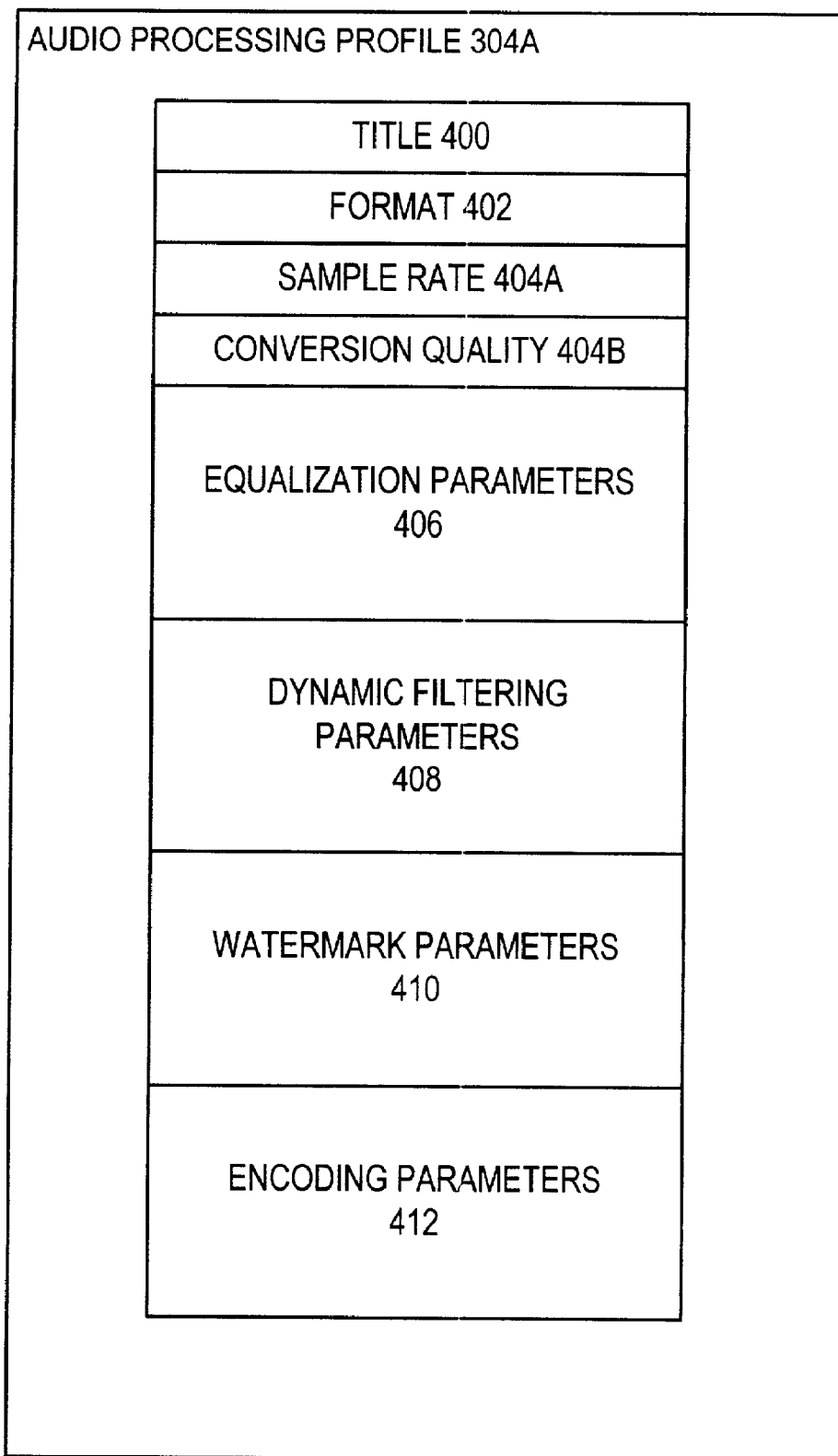
FIG. 4 is a block diagram of an audio processing profile of the profile collection of FIG. 3.

Audio processing profile 304A is shown in greater detail in FIG. 4. Audio processing profiles 304A–E (FIG. 3) are analogous to one another. Accordingly, FIG. 4 and the following description of audio processing profile 304A are equally applicable to audio processing profiles 304B–E.

Audio processing profile 304A includes a number of fields, each of which contain a collection of data defining a particular characteristic of audio processing profile 304A. Specifically, audio processing profile 304A includes a title field 400, a format field 402, a sample rate field 404A, a conversion quality field 404B, an equalization parameters field 406, a dynamic filtering parameters field 408, a watermark parameters field 410, and an encoder parameters field 412.

Title field 400 contains alphanumeric data by which a user identifies audio processing profile 304A. The particular data stored in title field 400 can be specified by the user by conventional user interface techniques and can be descriptive of the nature of processing specified by the parameters of audio processing profile 304A or of the type of audio signal yields particularly good results when processed according to audio processing profile 304A.

Format field 402 contains format data specifying an initial processing format of the audio signal of source audio file 102. Such format data includes (i) data specifying whether format converter 116 (FIG. 1) is to produce a mono-aural single-channel signal or a stereo, dual-channel signal from source audio file 102; (ii) data specifying a sample precision; and (iii) data specifying quantization compensation effects. When processing in accordance with audio processing profile 304A (FIG. 4), format converter 116 processes source audio file 102 in the following manner. If source audio file 102 stores a stereo signal and format field 402 contains data indicating that the resulting signal should be mono-aural, format converter 116 preforms a stereo-to-mono conversion on audio source file 102 to form a mono-aural intermediate signal. If source audio file 102 stores a mono-aural signal and format field 402 contains data indicating that the resulting signal should be stereo, format converter 116 performs a mono-to-stereo conversion on audio source file 102 to for a stereo intermediate signal. Otherwise, format converter 116 performs no conversion an the intermediate signal produced by format converter 116 is source audio file 102 in an unchanged form. Mono-to-stereo and stereo-to-mono conversions are well known. In one embodiment, stereo-to-mono conversion by format converter 116 is accomplished by reducing both channels in gain by 3 dB and summing the channels to produce a single, mono-aural channel.

In addition, format converter 116 converts the data word size, and precision, of each sample of the audio signal of source audio file 102 to a processing format as specified in format field 402 (FIG. 4). In addition, format converter 116 (FIG. 1) can dither the audio signal of source audio file 102 in accordance with dithering data stored in format field 402 (FIG. 4) to mask potentially undesirable effects of quantization in subsequent encoding. Dithering of digital audio signals is well-known.

Sample rate field 404A (FIG. 4) contains data specifying a delivery sample rate. When operating in accordance with audio processing profile 304A, sample rate converter 118 (FIG. 1) decimates or interpolates the intermediate signal produced by format converter 116 from the sample rate of source audio file 102 to the sample rate specified by the data contained in sample rate field 404A (FIG. 4). Decimation and interpolation of digital audio signals are well-known. In one embodiment, sample rate converter 118 (FIG. 1) uses a simple filter bank sample rate conversion technique based upon rational upsampling and downsampling ratios.

Sample rate converter 118 performs the rate conversion with a degree of signal quality specified by the data stored in sample rate field 404A. The result of processing by sample rate converter 118 is a decimated/interpolated intermediate signal.

Conversion quality field 404B (FIG. 4) contains data specifying a desired degree of fidelity of the decimated/interpolated intermediate signal to the original audio signal of source audio file 102 (FIG. 1). In one embodiment, the degree of fidelity is expressed as an interpolation filter size in which a high quality setting specifies a filter cut-off of −3 dB at a frequency of 90% of the delivery sample rate and in which a low quality setting specifies a filter cut-off of −3 dB at a frequency of 70% of the delivery sample rate. The larger filter of the higher quality setting reduces the amount of noise and distortion of the decimated/interpolated intermediate signal relative to the original audio signal of source audio file 102.

Equalization parameters field 406 (FIG. 4) contains data specifying parameters of an input gain filter and a number of low-shelf, band-pass, and high-shelf filters applied to the decimated/interpolated intermediate signal by audio effects processor 120 (FIG. 1) to produce an equalized intermediate signal. Equalization parameters field 406 (FIG. 4) is shown in greater detail in FIG. 5. Equalization parameters field 406 includes an input gain field 502 and fields specifying four separate filters. Each of the four filters includes a type field, a frequency field, a gain field, and a Q field such as type field 504A, frequency field 506A, gain field 508A, and Q field 510A, for example. Input gain field 502 contains data specifying an amount of gain to add to the decimated/interpolated intermediate signal prior to filtering according to fields 504A–D, 506A–D, 508A–D, and 510A–D. Each of type fields 504A–D contains data specifying one of three types of filters, namely, a low shelf filter, a band-pass filter, or a high shelf filter, for each respective one of the four filters. Each of frequency fields 506A–D contains data specifying a corresponding filter frequency for each respective one of the four filters. For band-pass filters, the specified filter frequency is the center of the frequency band of the filter. For low shelf filters, the specified filter frequency is the upper limit of the filtered frequencies. For high shelf filters, the specified filter frequency is the lower limit of the filtered frequencies. Each of gain fields 508A–D contains data specifying a corresponding gain for each respective one of the four filters. Each of Q fields 510A–D contains data specifying the filter selectivity for each respective one of the four filters. The filter selectivity, e.g., as represented in Q field 510B, is expressed as a ratio of the center frequency, e.g., as represented in frequency field 506B, to a passband.

For example, if the center frequency represented in frequency field 506B is 1 kHz and Q field 510B indicates a filter selectivity of 5, the passband for the associated filter is 200 Hz. In this illustrative embodiment, the passband is measured at the points at which the gain is −3 dB. Data in Q fields 510A–D are ignored for respective ones of the four filters which are not band-pass filters as indicated by respective ones of type fields 504A–D.

Processing by audio effects processor 120 (FIG. 1) in accordance with equalization parameters field 406 (FIG. 5) includes adjusting the decimated/interpolated intermediate signal by an amount of gain specified by data contained in input gain field 502 and processing the adjusted signal by the four filters specified in fields 504A–D, 506A–D, 508A–D, and 510A–D. The resulting signal is an equalized intermediate signal.

When operating in accordance with audio processing profile 304A (FIG. 4), audio effects processor 120 (FIG. 1) further filters the equalized intermediate signal in accordance with parameters represented in dynamic filtering parameters field 408 (FIG. 4) which is shown in greater detail in FIG. 6. Dynamic filtering parameters field 408 includes a bypass field 602, a stereo link field 604, an attack time field 606, a release time field 608, an expander ratio field 610, an expander threshold field 612, a compressor ratio field 614, a compressor threshold field 616, a limiter threshold field 618, an output gain field 620, and an output gain makeup field 622. Bypass field 602 contains data indicating whether filtering according to data stored in dynamic parameters field 408 (FIG. 4) is to be performed or bypassed altogether. Stereo link field 604 (FIG. 6) contains data indicating whether the left and right channels of a stereo signal should be linked. If the left and right channels are linked, the same amount of gain is applied to both channels. Otherwise, different amounts of gain can be applied to each channel.

Attack time field 606 and release time field 608 contain data representing attack time and release time, respectively, of a gain profile applied to the equalized intermediate signal by audio effects processor 120 (FIG. 1).

Expander ratio field 610 (FIG. 6) contains data specifying a first order gain profile to be applied by audio effects processor 120 (FIG. 1) to the equalized intermediate signal below an amplitude specified by data stored in expander threshold field 612 (FIG. 6).

Compressor ratio field 614 contains data specifying a first order gain profile to be applied by audio effects processor 120 (FIG. 1) to the equalized intermediate signal above an amplitude specified by data stored in compressor threshold field 616 (FIG. 6) and below an amplitude specified by data stored in limiter threshold field 618. The amplitude specified in limiter threshold field 618, which is sometimes referred to as the limiter threshold, represents a clip amplitude such that any samples of the equalized intermediate signal having an amplitude over the limiter threshold are clipped by audio effects processor 120 (FIG. 1) to have the limiter threshold as their amplitude.

Output gain field 620 (FIG. 6) contains data specifying a fixed gain to be applied by audio effects processor 120 (FIG. 1) to the equalized intermediate signal. Processing the equalized intermediate signal by audio effects processor 120 (FIG. 1) in accordance with watermark parameters field 410 (FIG. 4) of audio processing profile 304A produces a filtered intermediate signal which is processed by watermark processor 122 (FIG. 1). Watermark processor 122 embeds identification data in the filtered intermediate signal such that subsequent decoding of the subsequently encoded audio signal can identify audio signal processor 100 as the source of the encoded audio signal. In one embodiment, watermark processor 122 is the Electronic DNA watermarking system available from Solana Technology Development Corporation of San Diego, Calif. Watermark processor 122 modulates a noise sequence dependent upon the filtered intermediate signal using the identification data and adds the modulated noise sequence to the filtered intermediate signal to thereby embed the identification data in the filtered intermediate signal. The identification data can later be extracted using conventional techniques. Watermark parameters field 410 (FIG. 19) includes a bypass field 1902, a quality field 1904, and a fidelity field 1906. Bypass field 1902 contains data indicating whether the filtered intermediate signal is to be watermarked at all. Quality field 1904 contains data specifying a degree of watermarking quality in terms of a level of robustness required for anticipated noise and distortion in delivery media and subsequent playback environments. Fidelity field 1906 contains data which specifies a degree of audibility of the watermark in the resulting watermarked intermediate signal. Processing of the filtered intermediate signal by watermark processor 122 in accordance with audio processing profile 304A (FIG. 4) produces a watermarked intermediate signal which is processed by encoder 124.

Encoder 124 processes the watermarked intermediate signal according to encoding parameters stored in encoding parameters field 412 (FIG. 4) to produce an encoded audio signal. Encoding parameters field 412 is shown in greater detail in FIG. 18 and includes a data rate field 1802, a compression field 1804, an optimization field 1806, a quality field 1808, an auxiliary data rate field 1810, a bandwidth field 1812, a channel coupling field 1814, a coupling frequency field 1816, a verbose mode field 1818, a bandwidth filter field 1820, a LFE filter field 1822, a LFE channel field 1824, a DC filter field 1820, a phase shift field 1828, and a de-emphasis field 1830. In one embodiment, encoder 124 (FIG. 1) is the AC-3 audio encoder available from Dolby Laboratories Inc. of San Francisco, Calif. In this illustrative embodiment, the fields of encoding parameters field 412 (FIG. 18) and their use is defined by the AC-3 audio encoder. A few of the fields of encoding parameters field 412 are described herein for completeness.

Data rate field 1802 contains data specifying the data rate, and thus the size, of the encoded audio signal. Optimization field 1806 stores data indicating whether audio quality it to be optimized for downloading audio. Audio can be downloaded by a customer on certain conditions described more completely below. Quality field 1806 stores data representing a desired degree of signal quality to be maintained during encoding of the filtered intermediate signal. Bandwidth filter field 1820 contains data specifying whether a low pass filter is applied prior to encoding the filtered intermediate signal. Bandwidth field 1812 contains data specifying a threshold frequency for the low pass filter. Channel coupling field 1814 contains data specifying whether left and right channels of the filtered intermediate signal are to be coupled during encoding at frequencies about a threshold frequency represented by data stored in coupling frequency field 1816. DC filter field 1826 contains data specifying whether a high pass filter is applied prior to encoding the filtered intermediate signal.

Encoder 124 (FIG. 1) encodes the filtered intermediate signal in accordance with encoding parameters 412 (FIG. 18) in the manner described above. The result of encoding the watermarked intermediate signal by encoder 124 is an encoded audio signal, i.e., one of encoded audio signals 106A–E of composite resulting audio file 104.

Thus, data stored in audio processing profile 304A (FIG. 4) specifies characteristics of many steps of signal processing by which source audio file 102 is transformed into one of encoded audio signals 106A–E, e.g., encoded audio signal 106A. Such characteristics include characteristics of stereo/mono-aural conversion, sample interpolation/decimation, various types of filtering, watermark processing, and encoding. The power and advantage of storing all such processing characteristics in a single audio processing profile such as audio processing profile 304A (FIG. 4) is more fully appreciated in the context of graphical user interface 112 (FIG. 1).

Graphical User Interface 112

Graphical User Interface (GUI) 112 facilitates user control of processing by audio signal processor 100. Specifically, GUI 112 receives user-generated signals responsive to physical manipulation by the user of one or more user input devices 730 (FIG. 7) of a computer system 700 within which audio signal processor 100 executes. Full appreciation of the present invention and of GUI 112 (FIG. 1) is facilitated by a more complete understanding of computer system 700 (FIG. 7), i.e., the operating environment of audio signal processor 100.

Computer system 700 (FIG. 7) includes a processor 702 and memory 704 which is coupled to processor 702 through an interconnect 706. Interconnect 706 can include generally any interconnect mechanism for computer system components and can include, e.g., a bus, a crossbar, a mesh, a torus, or a hypercube. Processor 702 fetches from memory 704 computer instructions and executes the fetched computer instructions. In addition, processor 702 can fetch computer instructions through a computer network 770 through network access circuitry 760 such as a POTS or ISDN modem or ethernet network access circuitry. Processor 702 also reads data from and writes data to memory 704 and sends data and control signals through interconnect 706 to one or more computer display devices 720 and receives data and control signals through interconnect 706 from one or more computer user input devices 730 in accordance with fetched and executed computer instructions.

Memory 704 can include any type of computer memory and can include, without limitation, randomly accessible memory (RAM), read-only memory (ROM), and storage devices which include storage media such as magnetic and/or optical disks. Memory 704 includes audio signal processor 100 which is all or part of a computer process which in turn executes within processor 702 from memory 704. A computer process is generally a collection of computer instructions and data which collectively define a task performed by a computer system such as computer system 700.

Each of computer display devices 720 can be any type of computer display device including without limitation a printer, a cathode ray tube (CRT), a light-emitting diode (LED) display, or a liquid crystal display (LCD). Each of computer display devices 720 receives from processor 702 control signals and data and, in response to such control signals, displays the received data. Computer display devices 720, and the control thereof by processor 702, are conventional.

Each of user input devices 730 can be any type of user input device including, without limitation, a keyboard, a numeric keypad, or a pointing device such as an electronic mouse, trackball, lightpen, touch-sensitive pad, digitizing tablet, thumb wheels, joystick, or voice recognition circuitry. Each of user input devices 730 generates signals in response to physical manipulation by a user and transmits those signals through interconnect 706 to processor 702.

Computer system 700 also includes audio processing circuitry 780 coupled to interconnect 706 and one or more loudspeakers 790 coupled to audio processing circuitry 780. Audio processing circuitry 780 receives audio signals and control signals from processor 702 through interconnect 706 and, in response thereto, produces sounds through loudspeakers 790. Since the user of audio signal processor 100 selects filtering parameters in a manner described more completely below based upon subtle nuances in the tonal qualities of filtered audio signals as played through audio processing circuitry 780 and loudspeakers 790, it is preferred that audio processing circuitry 780 and loudspeakers 790 are of relatively high quality and perform with relatively high fidelity. In one embodiment, audio processing circuitry 780 is the AudioMedia III sound card available from DigiDesign Inc. of Palo Alto, Calif. and loudspeakers 790 are the 20-20 bas powered loudspeakers available from Event Electronics of Santa Barbara, Calif.

In one embodiment, computer system 700 is a computer system which is compatible with the PC personal computer available from International Business Machines, Inc. of Somers, N.Y., and processor 702 is based upon the architecture of the Pentium series of microprocessors available from Intel Corporation of Santa Clara, Calif. In this illustrative embodiment, computer system 700 executes, and operates under control of, the Microsoft Windows 95 operating system available from Microsoft Corporation of Redmond, Wash.

As described above, audio signal processor 100 executes within processor 702 from memory 704. Specifically, processor 702 fetches computer instructions from audio signal processor 100 and executes those computer instructions. Processor 702, in executing audio signal processor 100, reads digital audio signals from source audio file 102, processes and encodes those digital audio signals in the manner described above to form encode audio signals 106A–E (FIG. 1) of composite resulting audio file 104.

GUI 112 of audio signal processor 100 presents the user of audio signal processor 100 with a particularly effective tool for selecting a combination of values for the audio signal processing parameters described about of an audio processing profile relatively quickly with relatively little effort. Two considerations regarding measuring relative quality of audio signals are central to the design of GUI 112. First, each step of processing between source audio file 102 and encoded audio signals 106A–E affects the quality of encoded audio signals 106A–E when decoded and played through audio processing circuitry 780 and loudspeakers 790. Second, subtle variations in the quality of a sound are best detected when two alternative sounds are compared using A/B switching.

A/B switching generally refers to listening to a reproduced sound recording which is reproduced in two alternative environments and the particular one of the environments through which the sound is reproduced can be quickly switched during playback without noticeable interruption of the substantive sonic content of the reproduced sound. The following example is illustrative of A/B switching in a conventional context. Consider that the relative performance of two pairs of loudspeakers is being evaluated. In A/B switching, a sound recording such as a musical vinyl album is reproduced by a turntable, a pre-amplifier, and a stereo amplifier to which each pair of loudspeakers is coupled through a two-position switch which couples a selected one of the pairs to the stereo amplifier. By toggling the two-position switch, each pair of loudspeakers can by alternately coupled to the stereo amplifier for playback such that the pair of speakers through which the sound is reproduced changes without disturbing the continuity of the playback of the reproduced sound. In this way, a listener can focus on subtle differences in the closely juxtaposed sounds produced by the respective pairs of loudspeakers without distractions caused by discontinuity in the sonic content of the reproduced sound, e.g., the playback of the musical piece recorded in the vinyl album.

Both complete user control of the entirety of processing from source audio file 102 to encoded audio signals 106A–E and user controlled A/B switching during preview of encoded audio signals 106A–E combine to provide the user with an effective and efficient mechanism by which a user can select appropriate processing parameters to produce encoded audio signals 106A–E which can be delivered in real-time within a particular bandwidth and which, when decoded and reproduced, accurately represents source audio file 102 to the listening user.

GUI 112 (FIG. 1) displays a preview pane 802 (FIG. 8) of a window 800 in display screen 722 of computer display device 720A (FIG. 7) to present a user of audio signal processor 100 with control over every part of processing of source audio file 102 to form any of encoded audio signals 106A–E and with the ability to switch in mid-playback between playback of source audio file 102 and any of encoded audio signals 106A–E for critical listening in an A/B switching manner as described above. In one embodiment, encoded audio signals 106A–E are stored in RAM of memory 704 (FIG. 7) for efficient and quick access during preview of encoded audio signals 106A–E as described in the context of preview pane 802 (FIG. 8) and are stored in persistent form within composite resulting audio file 104 (FIG. 1) only when so directed by the user through conventional user interface techniques, typically after previewing by the user is completed.

GUI 112 (FIG. 1) displays in preview pane 802 (FIG. 8) a representation 804 of all or a selected part of source audio file 102 (FIG. 1). Representation 804 (FIG. 8) includes a left channel 820L representation and a right channel 820R representation from a starting time of source audio file 102 (FIG. 1) at the left edge of representation 804 (FIG. 8) to an ending time of source audio file 102 (FIG. 1) at the right edge of representation 804 (FIG. 4). In addition, GUI 112 (FIG. 1) displays in preview pane 802 (FIG. 8) a representation 806 of a corresponding part of a selected one of encoded audio signals 106A–E (FIG. 1), e.g., encoded audio signal 106A. Representation 806 (FIG. 8) includes a single channel 822 of a mono-aural channel of encoded audio signal 106A (FIG. 1) which begins at the left edge of representation 804 (FIG. 8) at the same time represented at the left edge of representation 802 and ends at the right edge of representation 804 at the same time represented at the right edge of representation 802. Accordingly, representations 802 and 804 are vertically aligned.

GUI 112 (FIG. 1) enables A/B switching between playback of source audio file 102 and any of encoded audio signals 106A–E, e.g., encoded audio signal 106A, by synchronizing continual updates of playback states between source audio file 102 and encoded audio signal 106A. Specifically, source audio file 102 includes, in addition to audio signal content 902 (FIG. 9), a current position field 904, an ending position field 906, and a sample rate field 908. Current position field 904 contains data representing the digital sample within content 902 of source audio file 102. As GUI 112 (FIG. 1) plays source audio file 102 through loudspeakers 790 (FIG. 7), GUI 112 (FIG. 1) retrieves the sample of content 902 (FIG. 9) identified by current pointer field 904 and increments current pointer field 904 to identify the next sample in an analogous position of content 902. At the same time, GUI 112 (FIG. 1) increments a current pointer field 1002 (FIG. 10) of header 108.

The analogous position is determined by measuring in an amount of time the offset of the next sample of content 902 (FIG. 9) as indicated by current pointer field 904 in the context of sample rate pointer 908 and determining the sample of the content of encoded audio signal 106A (FIG. 1) which corresponds to the same time offset in the context of the sample rate of the content of encoded audio signal 106A as represented in sample rate field 404A of audio processing profile 304A. As described above, encoded audio signal 106A is produced in accordance with parameters of audio processing profile 304A. For example, if the next sample of content 902 (FIG. 9) is the 44,000$^{th}$ sample of content 902 and the sample rate of content 902 is 44 kHz as represented in sample rate field 908, the time offset is one second. If the sample rate of the content of encoded audio signal 106A (FIG. 1) is 22 kHz, the next sample at the analogous position within the content of encoded audio signal 106A is the 22,000$^{th}$ sample of the content of encoded audio signal 106A.

Thus, the playback state of encoded audio signal 106A, which is represented by current pointer field 1002, is synchronized with the playback state of source audio file 102. In other words, current position field 904 and current position field 1002 identify the respective samples within content 902 and the content of encoded audio signal 106A, respectively, which represent the same sonic subject matter.

During playback of source audio file 102 (FIG. 1) or encoded audio signal 106A, GUI 112 is ready to detect signals which are generated by physical manipulation of user input devices 730 (FIG. 7) and which represent a command from the user to switch from playback of one audio signal to playback of another audio signal. In one embodiment, the user issues such a command by pressing either the up-arrow key or down-arrow key on a computer keyboard while holding the "Ctrl" key down, generally referred to as a Ctrl-up or a Ctrl-down key combination, respectively. Upon detection of such signals, GUI 112 (FIG. 1) no longer retrieves samples of content 902 (FIG. 9) but instead retrieves samples of the content of encoded audio signal 106A (FIG. 1) beginning with the next sample identified by current position field 1002 and sends the retrieved samples to audio processing circuitry 780 (FIG. 7) for conversion from digital signals to analog signals and for production as sounds in loudspeaker 790. During such playback of encoded audio signal 106A (FIG. 1), GUI 112 retrieves from the content of encoded audio signal 106A the sample identified by current position field 1002 (FIG. 10) and increments current position field 1002. Thus, since the playback state of encoded audio signal 106A (FIG. 1) is synchronized with source-audio file 102, switching from playback of source audio file 102 to playback of encoded audio signal 106A does not disrupt the continuity of the sonic subject matter. As a result, the user perceives that pressing the Ctrl-up or Ctrl-down key combination instantaneously switches between applying conversion, filtering, and encoding of an audio signal and bypassing such conversion, filtering, and encoding of the audio signal without disruption of the audio signal itself. Accordingly, GUI 112 presents the user with the particularly effective environment to compare source audio file 102 to encoded audio signal 106A and to listen carefully for, and detect, minor and subtle differences between encoded audio signal 106A and source audio file 102.

As described above, GUI 112 synchronizes the playback states of all of encoded audio signals 106A–E during playback of source audio file 102. GUI 112 allows the user to perform A/B switching during playback of any two of encoded audio signals 106A–E to determine which is the better encoding of source audio file 102. Specifically, GUI 112 receives signals generated by the user and which designate primary and second ones of encoded audio signals 106A–E. In one embodiment, the user generates such signals by pressing a secondary button, e.g., the right-side button, of a pointing device such as an electronic mouse or trackball while a cursor is positioned within display 806. Physical manipulation of pointing devices and the control of cursors thereby are well-known. In response thereto, GUI 112 displays a pop-up menu or, alternatively, a dialog box in which the user can select from a list of descriptions or titles of encoded audio signals 106A–E primary and secondary ones of encoded audio signals 106A–E. Pop-up menus and dialog boxes are well-known and are not described further herein. In the described illustrative embodiment, the user has selected encoded audio signals 106A and 106B as the primary and secondary encoded audio signals, respectively.

Figure 8:
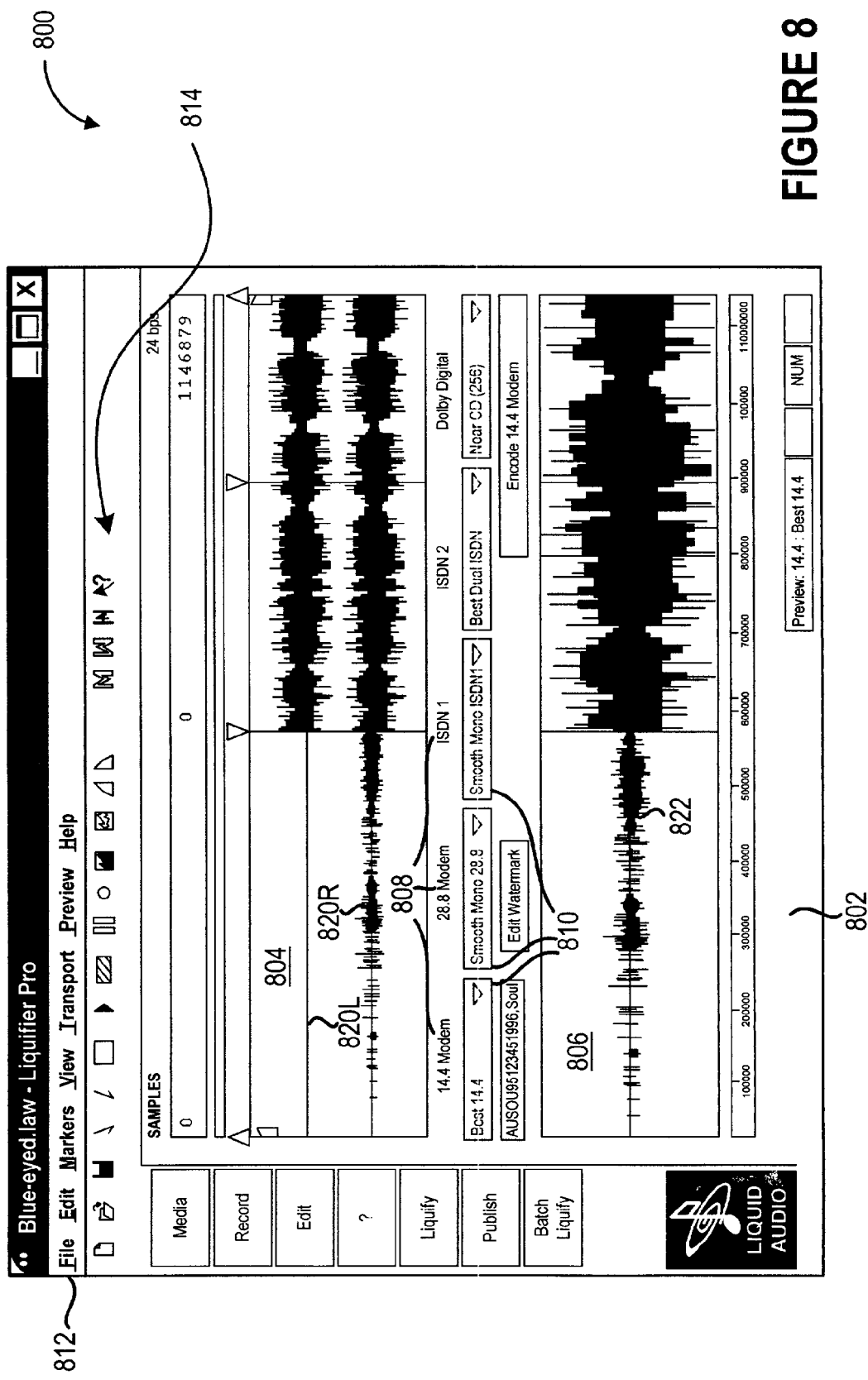
FIG. 8 is a screen view of a preview pane of the audio signal processor of FIG. 1.
Figure 10:
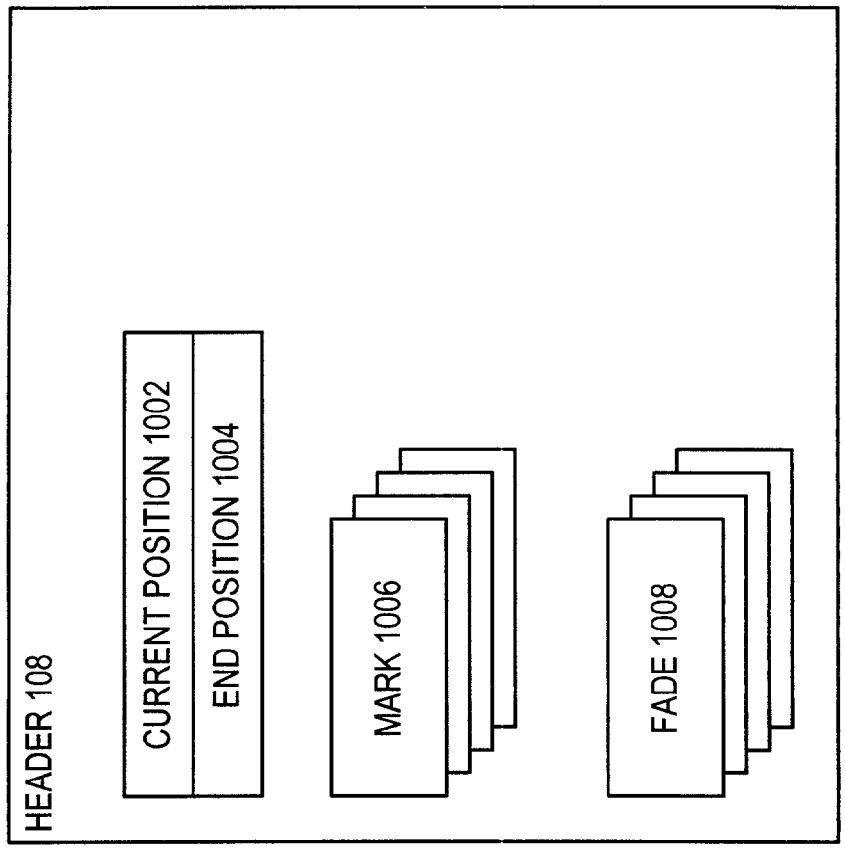
FIG. 10 is a block diagram of the header of the resulting composite resulting audio file of FIG. 1.

The primary encoded audio signal, e.g., encoded audio signal 106A, is represented in representation 806 (FIG. 8). During playback, GUI 112 (FIG. 1) plays the content of encoded audio signal 106A and continually updates the playback state represented in header 108 by current position field 1002 (FIG. 10). It should be noted that the playback state represented in header 108 is applicable to all of encoded audio signals 106A–E. Accordingly, concurrent updating of analogous playback states of encoded audio signals 106A-B is obviated. When the user generates signals so directing, e.g., by pressing the Ctrl-up or Ctrl-down key combination, GUI 112 (FIG. 1) receives the signals and, in response thereto, ceases playback of the content of encoded audio signal 106A and begins playback of analogous content of encoded audio signal 106B in accordance with the playback state of header 108.

In an alternative embodiment, each of representations 804 (FIG. 8) and 806 can represent either the audio signal of source audio file 102 or any of encoded audio signals 106A–E and user-controlled A/B switching toggles between playback of the audio signal represented in representation 804 (FIG. 8) and the audio signal represented in representation 806 in the synchronized manner described above. The user can select the particular audio signal to represent in either of representations 804 and 806 in the following manner. The user invokes the selection process using conventional user interface techniques, e.g., pressing a secondary button on a pointing device such as a mouse or trackball or clicking in the particular representation with a hot key— such as the Ctrl key—pressed. In response thereto, GUI 112 (FIG. 1) displays a pop-up menu which lists all available audio signals, including the audio signal of source audio file 102 and encoded audio signals 106A–E. The user can select an audio signal to be represented within either of representations 804 and 806 from the pop-up menu. In this way, the user has more flexibility in selecting which audio signals are represented in representations 804 and 086. For example, the user can select the audio signal of source audio file 102 for display in representation 806 and one of encoded audio signals 106A–E for representation 804 or can select any two of encoded audio signals 106A–E for representations 804 and 806. The user can then switch between synchronized playback of whichever audio signals are represented in representations 804 and 806.

GUI 112 (FIG. 1) limits A/B comparison of encoded audio signals to those encoded according to audio processing profiles of a single one of profile collections 202A–E (FIG. 2) in one embodiment. Thus, a sound engine using audio signal processor 100 (FIG. 1) focuses on fine tuning audio processing profiles for a particular delivery bandwidth and, once a reasonably optimized audio processing profile is selected for that delivery bandwidth, switches context to a different delivery bandwidth by pressing any of titles 808 (FIG. 8). The sound engineer can then focus on fine tuning audio processing profiles for the different delivery bandwidth.

Thus, since the playback state of encoded audio signals 106A and 106B are synchronized, switching from playback of encoded audio signal 106A to playback of encoded audio signal 106B does not disrupt the continuity of the reproduced sonic subject matter. As described above, the user perceives that pressing the Ctrl-up or Ctrl-down key combination instantaneously switches between applying conversion, filtering, and encoding of an audio signal according to two different audio processing profiles without disruption of the playback of the audio signal. Accordingly, GUI 112 presents the user with a particularly effective environment to compare encoded audio signals 106A and 106B and to listen carefully for, and detect, minor and subtle differences therebetween.

User Configuration of Audio Processing Profiles

GUI 112 (FIG. 1) displays in preview pane 802 (FIG. 8) a number of pull-down menus 810, each of which corresponds to a particular delivery bandwidth which is identified by a respective one of titles 808. In one embodiment, the delivery bandwidths with which pull-down menus 810 correspond include 14.4 kbps, 28.8 kbps, single-channel ISDN, dual-channel ISDN, and unlimited bandwidth. Unlimited bandwidth generally refers to non-real-time downloads in which audio signals can be downloaded for storage and subsequent playback, i.e., in which delivery bandwidth is not limiting.

Figure 11:
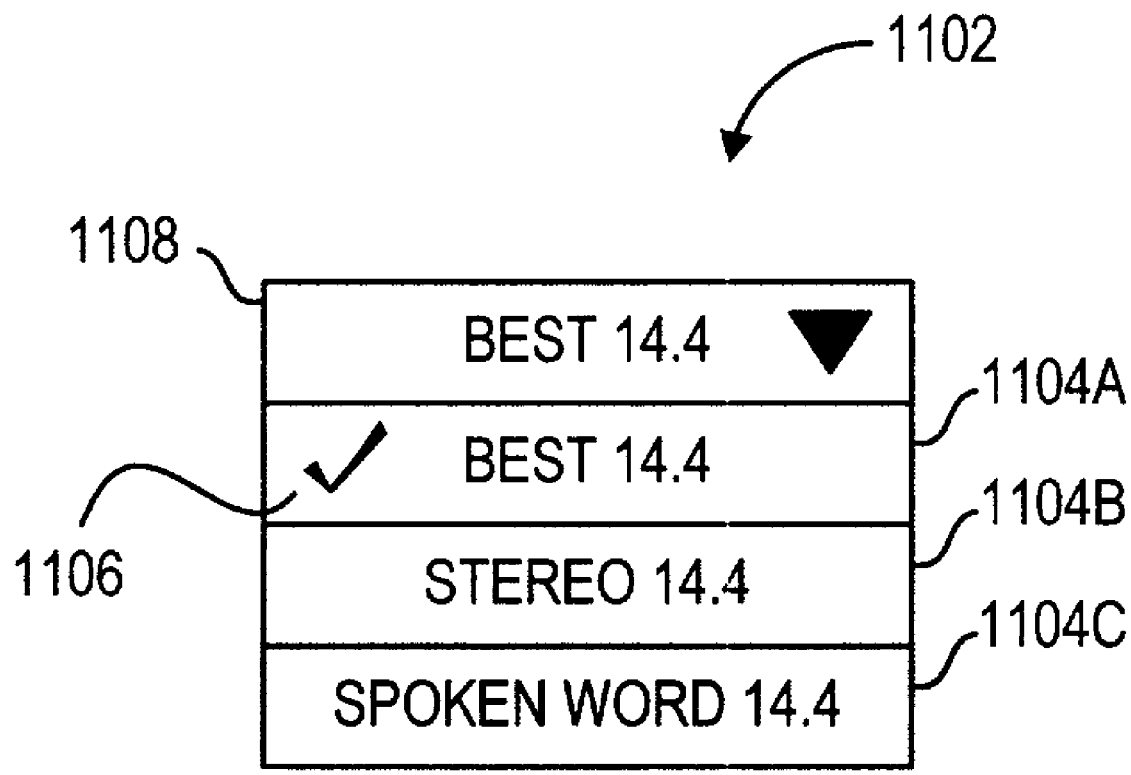
FIG. 11 is a pull-down menu by which a user selects one of a number of audio processing profiles according to the present invention.

Pressing any of pull-down menus 810 by known user interface techniques and physical manipulation of user input devices 730 (FIG. 7) causes GUI 112 (FIG. 1) to expand the pull-down menu, e.g., expanded pull-down menu 1102 (FIG. 11).

Pull-down menu 1102 includes pull-down menu title 1108 and options 1104A–C, each of which includes a textual title of a particular audio processing profile. Each of pull-down menus 810 (FIG. 8) is associated with a respective one of profile collections 202A–E (FIG. 2) of audio profile database 110. In this illustrative embodiment, the one of pull-down menus 810 corresponding to expanded pull-down menu 1102 (FIG. 11) corresponds to profile collection 202A (FIG. 3). Each title of options 1104A–C (FIG. 11) of pull-down menu 1102 corresponds to a respective one of audio processing profiles 304A–E (FIG. 11). For example, the textual title of option 1104A represents the title as represented in a title field 400 (FIG. 4) of corresponding audio processing profile 304A.

Profile collection 202A (FIG. 3) includes a selector 302 which identifies a selected one of audio processing profiles 304A–E as the audio processing profile which produces the best results, as determined by the user, when encoding source audio file 102 (FIG. 1) for delivery within the delivery bandwidth with which profile collection 202A (FIG. 3) and expanded pull-down menu 1102 (FIG. 11) correspond. A checkmark 1106 indicates to the user which of options 1104A–C correspond to the currently selected one of audio processing profiles 304A–E (FIG. 3) as indicated by selector 302. Pull-down menu title 1108 (FIG. 11) represents the title of the selected one of audio processing profiles 304A–E (FIG. 3) as identified by selector 302, e.g., audio processing profile 304A.

Once one of audio processing profiles 304A–E is selected by the user, the user can modify audio processing parameters as stored in the selected audio processing profile, e.g., audio processing profile 304A. The user can direct GUI 112 (FIG. 1) to initiate modification of audio processing profile 304A by selection of a designated option of pull-down menus 812 (FIG. 8) or a designated one of GUI buttons 814. In response to such direction by the user, which include signals generated by physical manipulation of user input devices 730 (FIG. 7) by the user, GUI 112 (FIG. 1) displays an audio processing profile edit window 1202 (FIG. 12), which includes the following GUI buttons: a stereo/mono button 1204, a sample rate button 1206, an equalizer button 1208, a dynamic filtering button 1210, a watermark button 1212, and an encoder button 1214. Audio processing profile edit window 1202 also includes a title box 1216, a cancel button 1220, and an OK button 1218.

The user can enter textual data into title box 1216 and such data is stored in title field 400 (FIG. 4) of audio processing profile 304A. In one embodiment, entering of a new textual title by the user indicates that a new audio processing profile, e.g., audio processing profile 304E, is to be created. In an alternative embodiment, the user is permitted to modify the textual data of the title of an existing audio processing profile, e.g., audio processing profile 304A. Specification by the user of the various processing parameters stored in the various field of an audio processing profile is the same in both embodiments. Accordingly, the following description of modification of the processing parameters of audio profile 304A is equally applicable to specification by the user of processing parameters of a newly created audio processing profile. In addition, audio processing profiles, which are predetermined and which are directly analogous to audio processing profiles 304A–E, are programmed directly into audio signal processor 100 (FIG. 1) and are therefore readonly. Accordingly, the user is not permitted to modify these predetermined audio processing profiles but can process the audio signal of source audio file 102 according to any of the predetermined audio processing profiles. However, in one embodiment, the user is permitted to copy a predetermined audio processing profile into a new user-defined audio processing profile such that the user can further augment any of the predetermined audio processing profiles.

When the user presses OK button 1218 (FIG. 12), GUI 112 (FIG. 1) stores all data entered by the user in audio processing profile edit window 1202 (FIG. 12) and any data corresponding to audio processing profile 304A (FIG. 4) by pressing any of GUI buttons 1204–1214 (FIG. 12) to be stored in audio processing profile 304A and GUI 112 (FIG. 1) closes audio processing profile edit window 1202 (FIG. 12) thereby terminating modification of parameters of audio processing profile 304A (FIG. 4) by the user. When the user presses cancel button 1220 (FIG. 12), GUI terminates modification of parameters of audio processing profile 304A (FIG. 4) without storing data entered by the user through audio processing profile edit window 1202 (FIG. 12) or any window displayed by pressing any of GUI buttons 1204–1214 in audio processing profile 304A (FIG. 4).

Figure 12:
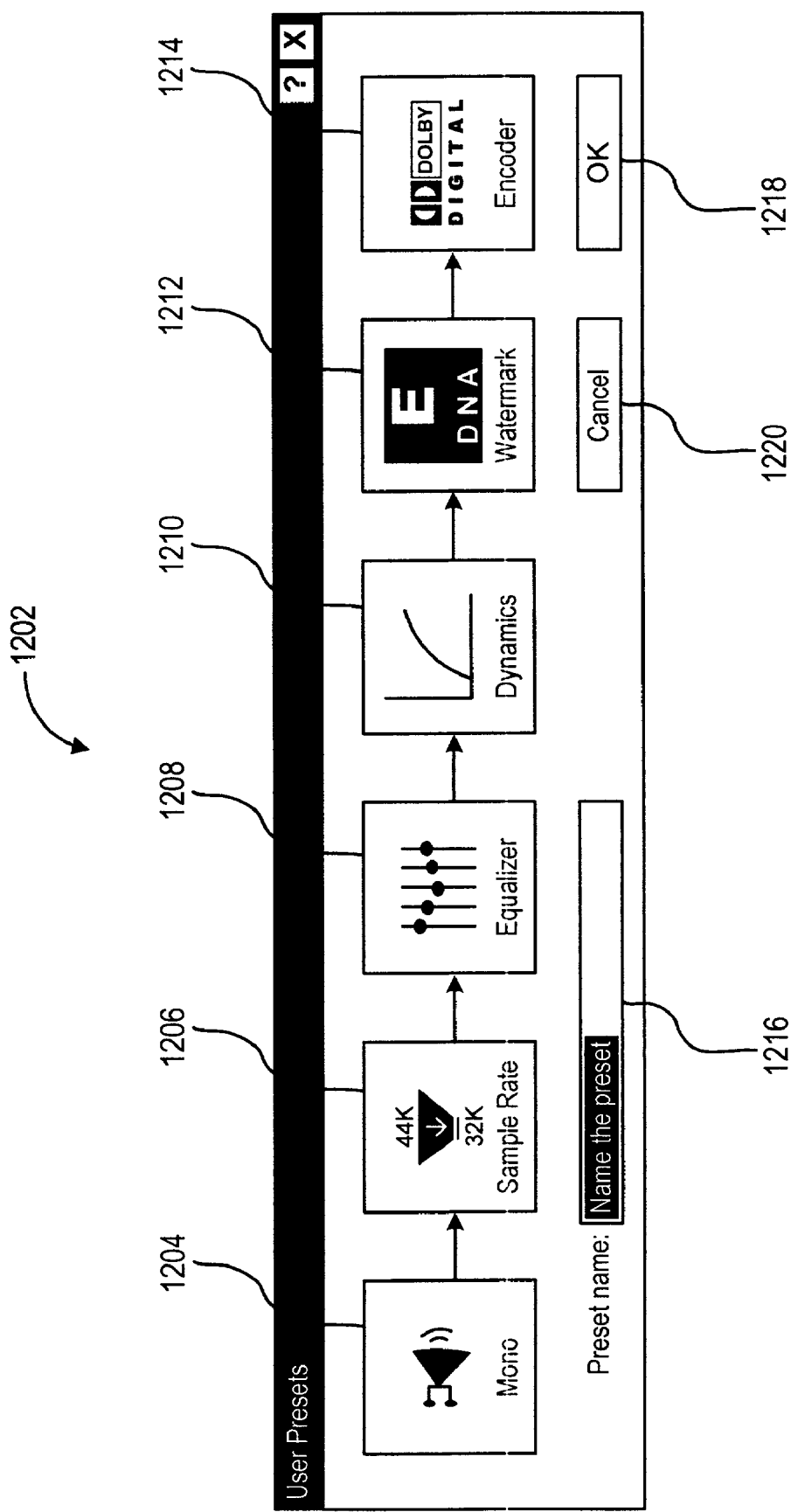
FIG. 12 is a screen view of an audio processing profile edit window by which the user can configure audio signal processing parameters in accordance with the present invention.

Pressing stereo/mono button 1204 (FIG. 12) by the user causes GUI 112 (FIG. 1) to toggle the state of data stored in mono/stereo field 402 (FIG. 4) between data representing stereo audio signals and data representing mono-aural signals. The current state of mono/stereo field 402 is represented graphically in the representation of stereo/mono button 1204 (FIG. 12). For example, stereo/mono button 1204 (FIG. 12) graphically represents that mono/stereo converter 116 (FIG. 1) produces a mono-aural intermediate signal from source audio file 102.

Figure 7:
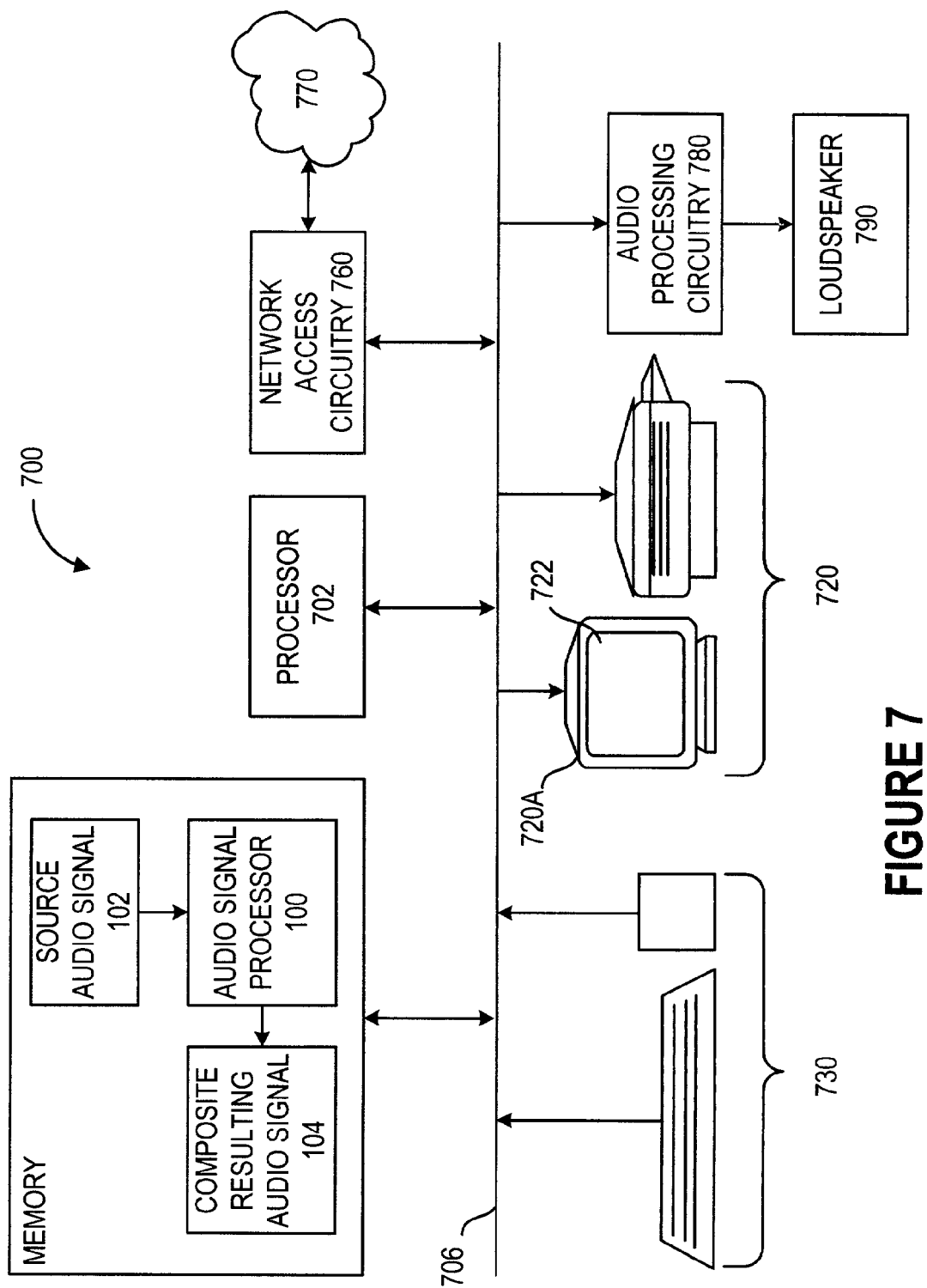
FIG. 7 is a block diagram of a computer system within which the audio signal processor of FIG. 1 executes.
Figure 13:
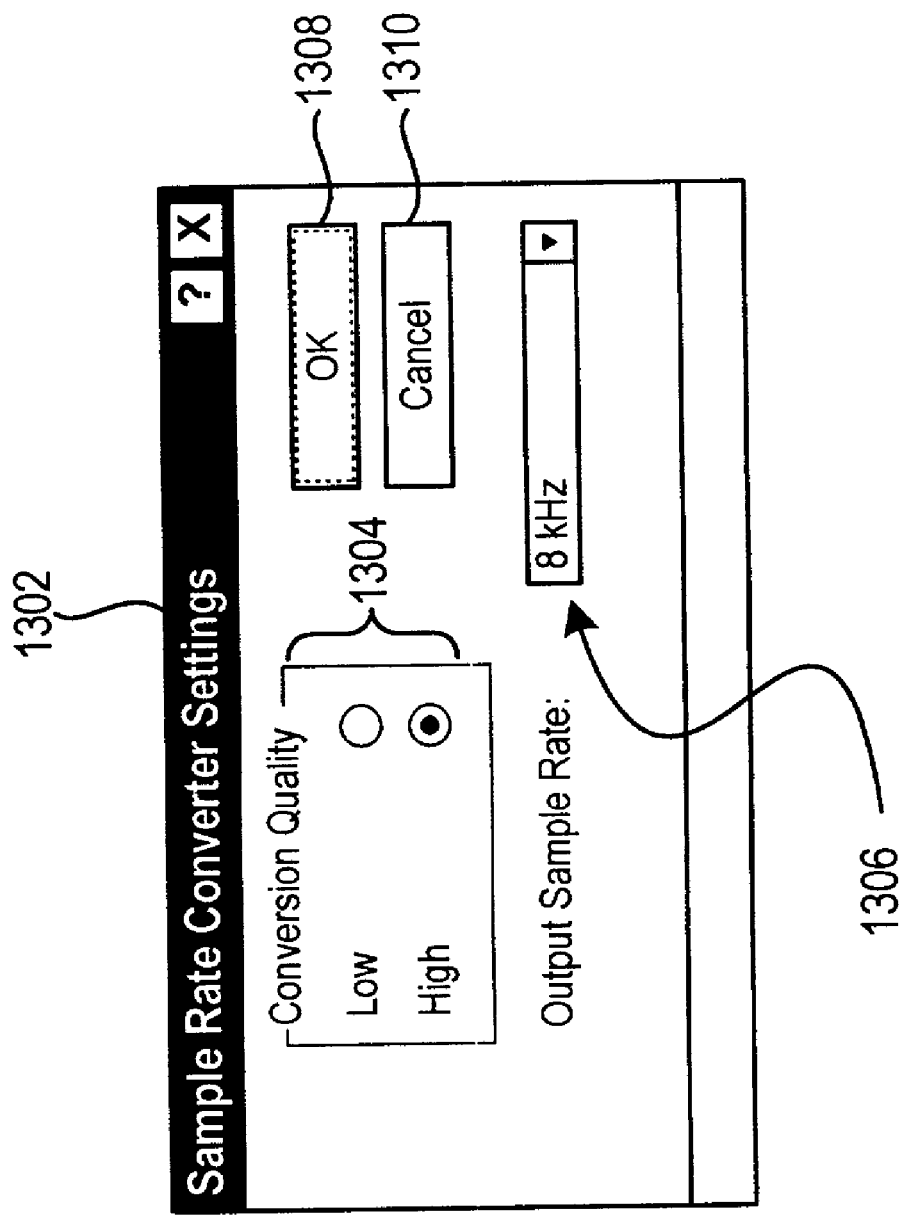
FIG. 13 is a screen view of a sample rate window by which the user can configure audio signal processing parameters in accordance with the present invention.

When GUI 112 (FIG. 1) receives signals from user input devices 730 (FIG. 7) which indicate the user has selected sample rate button 1206 (FIG. 12), GUI 112 displays in display screen 122 a sample rate window 1302 (FIG. 13). Sample rate window 1302 includes radio buttons 1304 which allow the user to select between low and high conversion quality. The user selects either of radio button 1304 by conventional user-interface techniques which include physical manipulation of one or more of user input devices 730 (FIG. 7). Briefly, selection of any of radio buttons 1304 by the user automatically de-selects all others of radio buttons 1304. The state of data contained in conversion quality field 404B (FIG. 4) of audio processing profile 304A is reflected by GUI 112 in the graphical representation of radio buttons 1304 in accordance with radio button selections by the user.

Sample rate window 1302 also includes a pull-down menu 1306 from which the user selects one of a number of output sample rates to which sample rate converter 118 (FIG. 1) can convert an audio signal. The user selects one of the output sample rates of pull-down menu 1306 and data representing the selected sample rate is stored in sample rate field 404A (FIG. 4) of audio processing profile 304A. When the user presses OK button 1308, GUI 112 receives signals so indicating from user input devices 730 (FIG. 7) and, in response thereto, closes sample rate window 1302 and saves in sample rate field 404A and conversion quality field 404B data represented in pull-down menu 1306 and radio buttons 1304, respectively. When the user presses cancel button 1310, GUI 112 receives signals so indicating from user input devices 730 (FIG. 7) and, in response thereto, closes sample rate window 1302 and reverts sample rate field 404A and conversion quality field 404B such that data stored therein remains unchanged.

Figure 14:
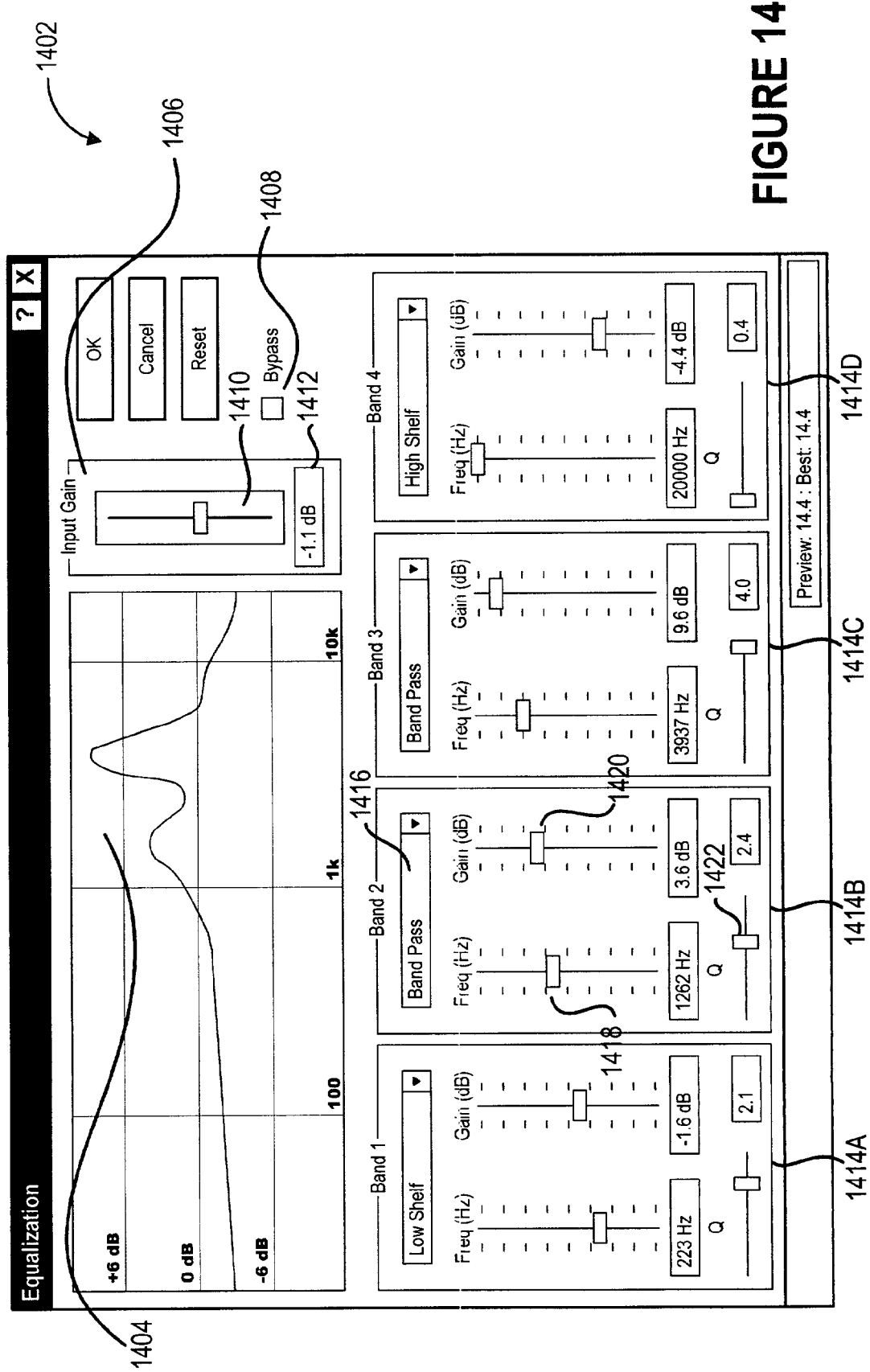
FIG. 14 is a screen view of an equalizer window by which the user can configure audio signal processing parameters in accordance with the present invention.

When GUI 112 (FIG. 1) receives signals from user input devices 730 (FIG. 7) which indicate the user has selected equalizer button 1208 (FIG. 12), GUI 112 displays in display screen 122 an equalizer window 1402 (FIG. 14). Equalizer window 1402 includes a display 1404 which graphical represents the gain applied to the decimated/interpolated intermediate signal produced by sample rate converter 118 (FIG. 1) across a frequency spectrum, i.e., represents the aggregate effect of filtering the decimated/interpolated intermediate signal according to data stored equalization parameters field 406 (FIG. 4) of audio processing profile 304A.

Equalizer window 1402 (FIG. 14) includes an input gain slider 1406 by which the user can control an input gain value as represented in a text box 1412. Input gain slider 1406 includes a GUI slider 1410 which is responsive to signals received by GUI 112 (FIG. 1) from physical manipulation by the user. GUI sliders are well-known. GUI 112 stores data representing the input gain value in input gain field 502 (FIG. 5) of equalization parameters field 406.

A bypass check-box 1408 (FIG. 14) of equalization window 1402 represents the current boolean value represented in bypass field 512 (FIG. 5) of equalization parameters field 406. GUI 112 receives from user input devices 730 (FIG. 7)

signals generated by the user and which control the state of bypass check-box 1408 (FIG. 14) and, accordingly, the state of data stored in bypass field 512 (FIG. 5). A boolean true value stored in bypass field 512 causes audio signal processor 120 (FIG. 1), in forming the equalized intermediate signal from the decimated/interpolated intermediate signal, to forego all processing in the manner represented in equalization parameters field 406 (FIG. 5) and in equalization window 1402 (FIG. 14). Conversely, a boolean false value stored in bypass field 512 (FIG. 5) causes audio signal processor 120 to effect such processing.

Equalization window 1402 (FIG. 14) includes four filter boxes 1414A–D, each of which corresponds to a respective one of filter fields 514A–D (FIG. 5) of equalization parameters field 406. Filter boxes 1414A–D are analogous to one another and the following description of filter box 1414B is equally applicable to filter boxes 1414A and 1414C–D. In this illustrative embodiment, filter box 1414B corresponds to filter field 514B (FIG. 5), which includes type field 504B, frequency field 506B, gain field 508B, and Q field 510B. Filter box 1414B (FIG. 14) includes a pull-down menu 1416, a frequency slider 1418, a gain slider 1420, and a Q slider 1422. The user can select from pull-down menu 1416 one of several types of filters, including "Low Shelf," "Band Pass," and "High Pass." GUI 112 (FIG. 1) receives signals generated by the user and representing a selected filter types and stores data representing the selected filter type in type field 504B. Frequency slider 1418 (FIG. 14), gain slider 1420, and Q slider 1422 are controlled by GUI 112 (FIG. 1) in response to signals received from user input devices 730 in response to physical manipulation by the user to thereby control represented values of data stored in frequency field 506B (FIG. 5), gain field 508B, and Q field 510B. In this way, the user can control, through the GUI mechanisms provided in filter box 1414B (FIG. 14), values of data stored in frequency field 506B (FIG. 5), gain field 508B, and Q field 510B. The user can therefore specify several filters applied to the decimated/interpolated intermediate signal as represented in display 1404 (FIG. 14) to form the equalized intermediate signal.

Figure 15:
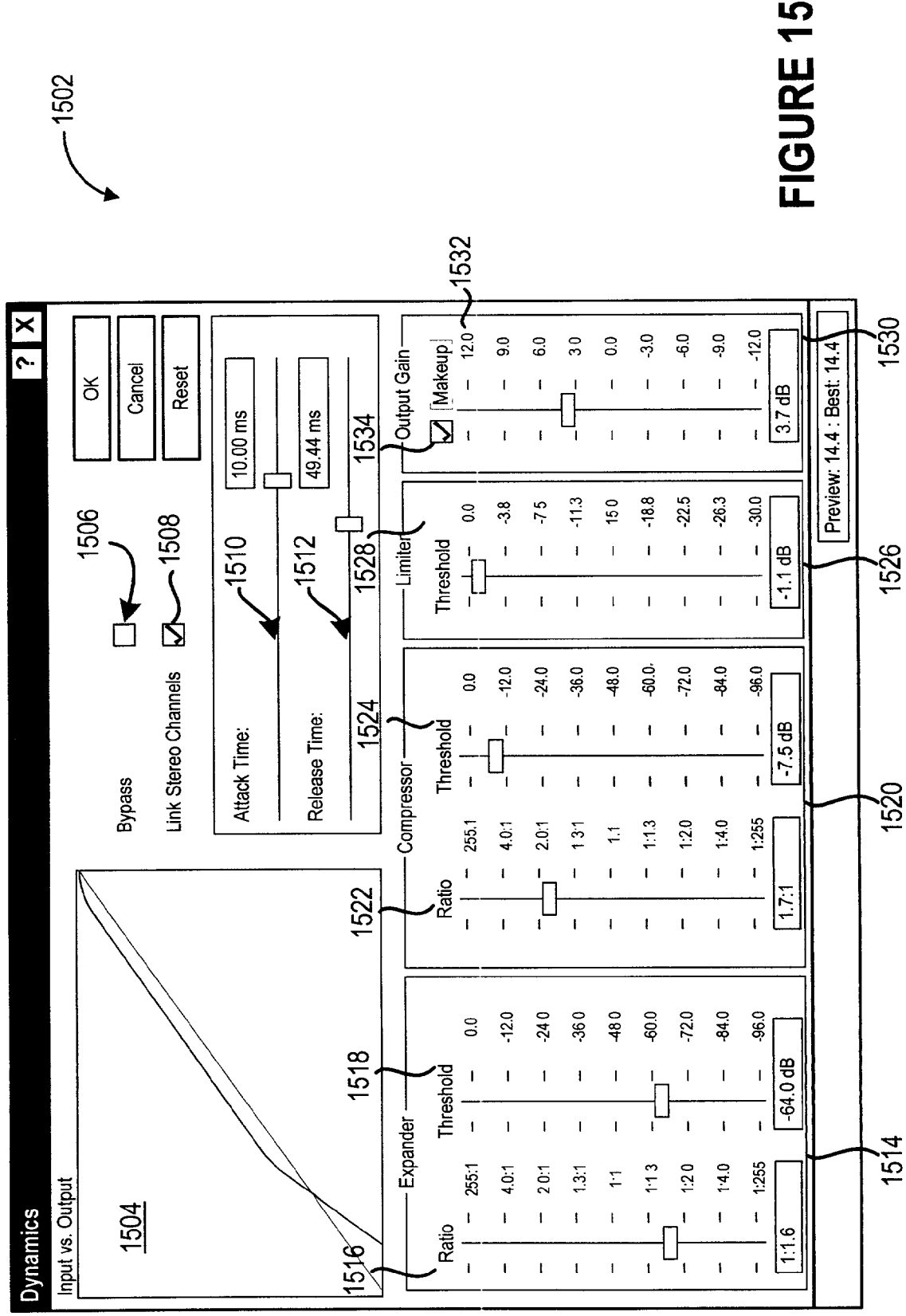
FIG. 15 is a screen view of a dynamic filtering window by which the user can configure audio signal processing parameters in accordance with the present invention.

When GUI 112 (FIG. 1) receives signals from user input devices 730 (FIG. 7) which indicate the user has selected dynamic filtering button 1210 (FIG. 12), GUI 112 (FIG. 1) displays in display screen 122 a dynamic filtering window 1502 (FIG. 15). Dynamic window 1402 includes a display 1504 which graphically represents the relationship between the equalized intermediate signal and the filtered intermediate signal, i.e., represents the aggregate effect of filtering the equalized intermediate signal according to data stored dynamic filtering parameters field 408 (FIG. 4) of audio processing profile 304A.

Dynamic filtering window 1502 (FIG. 15) includes a bypass check-box 1506, a link check-box 1508, an attack time slider 1510, a release time slider 1512, an expander filter box 1514, a compressor filter box 1520, a limiter box 1526, and an output gain box 1530.

Bypass check-box 1506 (FIG. 15) of dynamic filtering window 1502 represents the current boolean value represented in bypass field 602 (FIG. 6) of dynamic filtering parameters field 408. GUI 112 (FIG. 1) receives from user input devices 730 (FIG. 7) signals generated by the user and which control the state of bypass check-box 1506 (FIG. 15) and, accordingly, the state of data stored in bypass field 602 (FIG. 6). A boolean true value stored in bypass field 602 causes audio signal processor 120 (FIG. 1), in forming the equalized intermediate signal from the decimated/interpolated intermediate signal, to forego all processing in the manner represented in dynamic filtering parameters field 408 (FIG. 5) and in dynamic filtering window 1502 (FIG. 15). Conversely, a boolean false value stored in bypass field 602 (FIG. 6) causes audio signal processor 120 to effect such processing.

Link check-box 1508 (FIG. 15) of dynamic filtering window 1502 represents the current boolean value represented in stereo link field 604 (FIG. 6) of dynamic filtering parameters field 408. GUI 112 (FIG. 1) receives from user input devices 730 (FIG. 7) signals generated by the user and which control the state of link check-box 1508 (FIG. 15) and, accordingly, the state of data stored in stereo link field 604 (FIG. 6).

Attack time slider 1510 (FIG. 15) and release time slider 1512 of dynamic filtering window 1502 graphically represent the current values represented in attack time field 606 (FIG. 6) and release time field 608, respectively, of dynamic filtering parameters field 408. GUI 112 (FIG. 1) receives from user input devices 730 (FIG. 7) signals generated by the user and which control the state of attack time slider 1510 (FIG. 15) and release time slider 1512 and, accordingly, the values represented in attack time field 606 (FIG. 6) and release time field 608. Attack time field 606 and release time field 608 have values within the ranges of 100 microseconds to 100 milliseconds and one millisecond to one second, respectively.

Expander filter box 1514 (FIG. 15) includes a ratio slider 1516 and a threshold slider 1518. Ratio slider 1516 and threshold slider 1518 graphically represent the current values represented in expander ratio field 610 (FIG. 6) and expander threshold field 612, respectively, of dynamic filtering parameters field 408. GUI 112 (FIG. 1) receives from user input devices 730 (FIG. 7) signals generated by the user and which control the state of ratio slider 1516 (FIG. 15) and threshold slider 1518 and, accordingly, the values represented in expander ratio field 610 (FIG. 6) and expander threshold field 612, respectively. As shown in expander filter box 1514 (FIG. 15), expander ratio field 610 (FIG. 6) and expander threshold field 612 have values within the ranges of 255:1 to 1:255 and 0.0 dB to −96.0 dB, respectively.

Compressor filter box 1520 (FIG. 15) includes a ratio slider 1522 and a threshold slider 1524. Ratio slider 1522 and threshold slider 1524 graphically represent the current values represented in compressor ratio field 614 (FIG. 6) and compressor threshold field 616, respectively, of dynamic filtering parameters field 408. GUI 112 (FIG. 1) receives from user input devices 730 (FIG. 7) signals generated by the user and which control the state of ratio slider 1522 (FIG. 15) and threshold slider 1524 and, accordingly, the values represented in compressor ratio field 614 (FIG. 6) and compressor threshold field 616. As shown in compressor filter box 1520 (FIG. 15), compressor ratio field 614 (FIG. 6) and compressor threshold field 616 have values within in the ranges of 255:1 to 1:255 and 0.0 dB to −96.0 dB, respectively.

Limiter box 1526 (FIG. 15) includes a threshold slider 1528. Threshold slider 1528 graphically represents the current value represented in limiter threshold field 618 (FIG. 6) of dynamic filtering parameters field 408. GUI 112 (FIG. 1) receives from user input devices 730 (FIG. 7) signals generated by the user and which control the state of threshold slider 1528 (FIG. 15) and, accordingly, the value represented in limiter threshold field 618 (FIG. 6). As shown in limiter box 1526 (FIG. 15), limiter threshold field 618 (FIG. 6) has values within the range of 0.0 dB to −30.0 dB.

Output gain box 1520 (FIG. 15) includes a gain slider 1532 and a make-up check-box 1534. Gain slider 1532 and make-up check-box 1534 graphically represent the current values represented in output gain field 620 (FIG. 6) and output gain make-up field 622, respectively, of dynamic filtering parameters field 408. GUI 112 (FIG. 1) receives from user input devices 730 (FIG. 7) signals generated by the user and which control the state of gain slider 1532 (FIG. 15) and make-up check-box 1534 and, accordingly, the values represented in output gain field 620 (FIG. 6) and output gain make-up field 622. As shown in output gain box 1530 (FIG. 15), output gain field 620 (FIG. 6) has values within the range of 12.0 dB and −12.0 dB. Output gain make-up field 622 has a boolean value of either true or false.

Thus, through dynamic filtering window 1502, GUI 112 (FIG. 1) provides the user with an interface for controlling the values of various parameters represented in the fields of dynamic filtering field 408.

Figure 16:
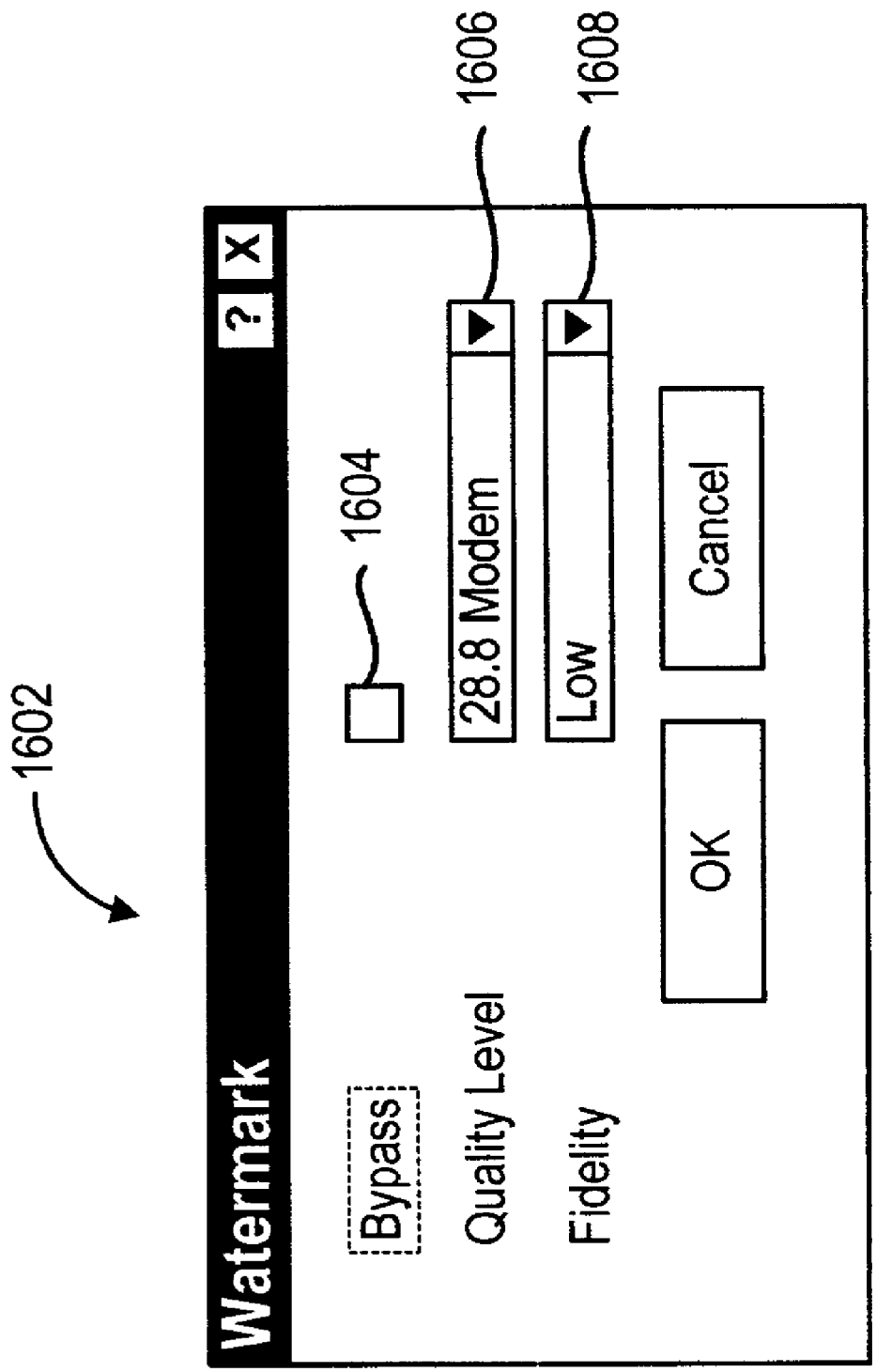
FIG. 16 is a screen view of a watermark window by which the user can configure audio signal processing parameters in accordance with the present invention.

When GUI 112 (FIG. 1) receives signals from user input devices 730 (FIG. 7) which indicate the user has selected watermark button 1212 (FIG. 12), GUI 112 (FIG. 1) displays in display screen 122 a watermark window 1602 (FIG. 16).

Watermark window 1602 includes a bypass check-box 1604, a quality pull-down menu 1606, and a fidelity pull-down menu 1608 which graphically represent current values represented in bypass field 1902 (FIG. 19), quality field 1904, and fidelity field 1906, respectively. GUI 112 (FIG. 1) receives from user input devices 730 (FIG. 7) signals generated by the user and which control the state of bypass field 1902 (FIG. 19), quality field 1904, and fidelity field 1906 and, accordingly, the values represented in bypass field 1902 (FIG. 19), quality field 1904, and fidelity field 1906, respectively. The set of valid values as controlled by quality field 1904 and fidelity field 1906 is determined by the particular operational characteristics of watermark processor 122. Bypass field 1902 (FIG. 19) has a boolean value of either true or false.

Thus, through watermark window 1602, GUI 112 (FIG. 1) provides the user with an interface for controlling the values of various parameters represented in the fields of watermark parameters field 410.

Figure 17:
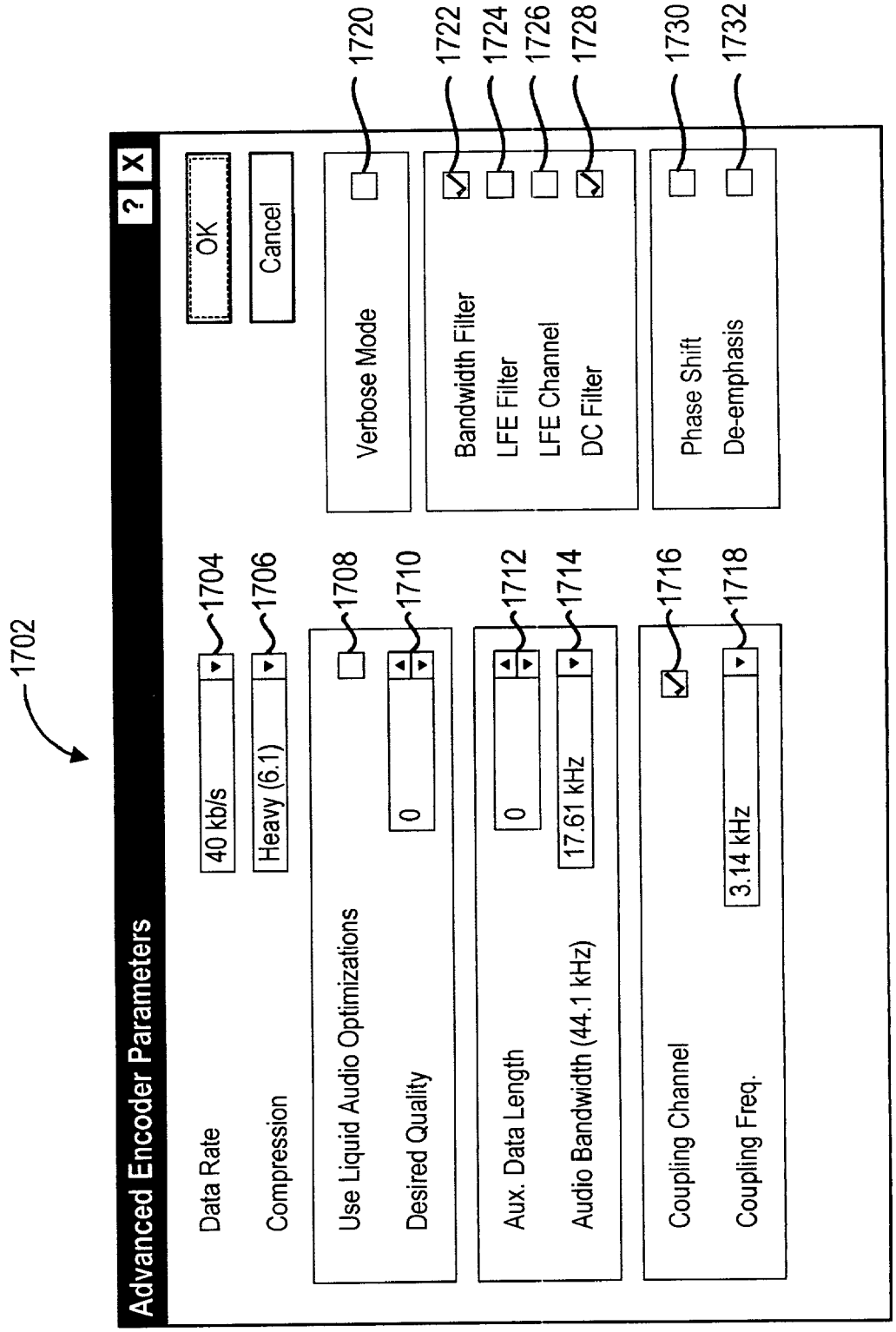
FIG. 17 is a screen view of an encoder window by which the user can configure audio signal processing parameters in accordance with the present invention.

When GUI 112 (FIG. 1) receives signals from user input devices 730 (FIG. 7) which indicate the user has selected encoder button 1210 (FIG. 12), GUI 112 (FIG. 1) displays in display screen 122 a encoder window 1702 (FIG. 17).

Encoder window 1702 includes a data rate menu 1704 which is a pull-down menu from which the user can select one of a number of encoding data rates. Through data rate menu 1704, the user controls the data rate represented in data rate field 1802 (FIG. 18) of encoder parameters field 412. GUI 112 (FIG. 1) receives from user input devices 730 (FIG. 7) signals generated by the user and which control the state of data rate menu 1704 (FIG. 17) and, accordingly, the value represented in data rate field 1802 (FIG. 18).

To control compression rate of encoded audio signal 106A as represented in compression field 1804 (FIG. 18), encoder window 1702 (FIG. 17) includes a compression menu 1706 which is a pull-down menu from which the user can select one of a number of encoding compression types. Through compression menu 1706, the user controls the compression type represented in compression field 1804 (FIG. 18) of encoder parameters field 412. GUI 112 (FIG. 1) receives from user input devices 730 (FIG. 7) signals generated by the user and which control the state of compression menu 1706 (FIG. 17) and, accordingly, the value represented in compression field 1804 (FIG. 18).

Encoder window 1702 (FIG. 17) includes an optimization check-box 1708 and an optimization quality text-box 1710 by which the user can select a degree of encoding optimization. Optimization check-box 1708 and optimization quality text-box 1710 represent the current state of data stored in LA optimization field 1806 (FIG. 18) and quality field 1808, respectively. GUI 112 (FIG. 1) receives from user input devices 730 (FIG. 7) signals generated by the user and which control the state of optimization check-box 1708 (FIG. 17) and optimization quality text-box 1710 and, accordingly, the values represented in LA optimization field 1806 and quality field 1808 (FIG. 18), respectively. Specifically, the user can control optimization check-box 1708 (FIG. 17) to toggle the value represented in LA optimization field 1806 (FIG. 18) between boolean true and false values and can control optimization text-box 1710 (FIG. 17) to specify a numeric value represented in quality field 1808 (FIG. 18).

Encoder window 1702 (FIG. 17) includes an auxiliary data length text-box 1712 and an audio bandwidth text-box 1714. Auxiliary data length text-box 1712 and audio bandwidth text-box 1714 represent the current state of data stored in auxiliary data length field 1810 (FIG. 18) and bandwidth field 1812, respectively. GUI 112 (FIG. 1) receives from user input devices 730 (FIG. 7) signals generated by the user and which control the state of auxiliary data length text-box 1712 (FIG. 17) and audio bandwidth text-box 1714 and, accordingly, the values represented in auxiliary data length field 1810 and bandwidth field 1812 (FIG. 18), respectively. Specifically, the user can control auxiliary data length text-box 1712 (FIG. 17) and audio bandwidth text-box 1714 to specify numeric values represented in auxiliary data length field 1810 (FIG. 18) and bandwidth field 1812, respectively.

Encoder window 1702 (FIG. 17) includes a channel coupling check-box 1716 and a coupling frequency text-box 1718. Channel coupling check-box 1716 and coupling frequency text-box 1718 represent the current state of data stored in channel coupling field 1814 (FIG. 18) and coupling frequency field 1816, respectively. GUI 112 (FIG. 1) receives from user input devices 730 (FIG. 7) signals generated by the user and which control the state of channel coupling check-box 1716 (FIG. 17) and coupling frequency text-box 1718 and, accordingly, the values represented in channel coupling field 1814 (FIG. 18) and coupling frequency field 1816, respectively. Specifically, the user can control channel coupling check-box 1716 (FIG. 17) to toggle the value represented in channel coupling field 1814 (FIG. 18) between boolean true and false values and can control coupling frequency text-box 1718 (FIG. 17) to specify a numeric value represented in coupling frequency field 1816 (FIG. 18).

In addition, to allow the user to further control the manner in which the watermarked intermediate signal is encoded by encoder 124 (FIG. 1), encoder window 1702 (FIG. 17) includes a number check-boxes 1720–1732, each of which represents and controls a respective boolean value stored in a respective one of fields 1818–1830 (FIG. 18) of encoder parameters field 412. GUI 112 (FIG. 1) receives from user input devices 730 (FIG. 7) signals generated by the user and which control the state of check-boxes 1720–1732 (FIG. 17) and, accordingly, the respective boolean values represented in fields 1818–1830 (FIG. 18). Specifically, encoder window 1702 (FIG. 17) includes a verbose mode check-box 1720, a bandwidth filter check-box 1722, an LFE filter check-box 1724, an LFE channel check-box 1726, a DC filter check-box 1728, a phase shift check-box 1730, and a de-emphasis check-box 1732 which represent and control boolean values stored in verbose mode field 1818 (FIG. 18), bandwidth filter field 1820, LFE filter field 1822, LFE channel field 1824, DC filter field 1826, phase shift field 1828, and de-emphasis field 1830.

Thus, through encoder window 1702 (FIG. 17), GUI 112 (FIG. 1) provides the user with an interface for controlling the values of various parameters represented in the fields of encoder parameters field 408 (FIG. 18) and therefore the manner in which encoder 124 (FIG. 1) encodes the watermarked intermediate signal to form encoded audio signals 106A–D.

Previewing Clips

Figure 20:
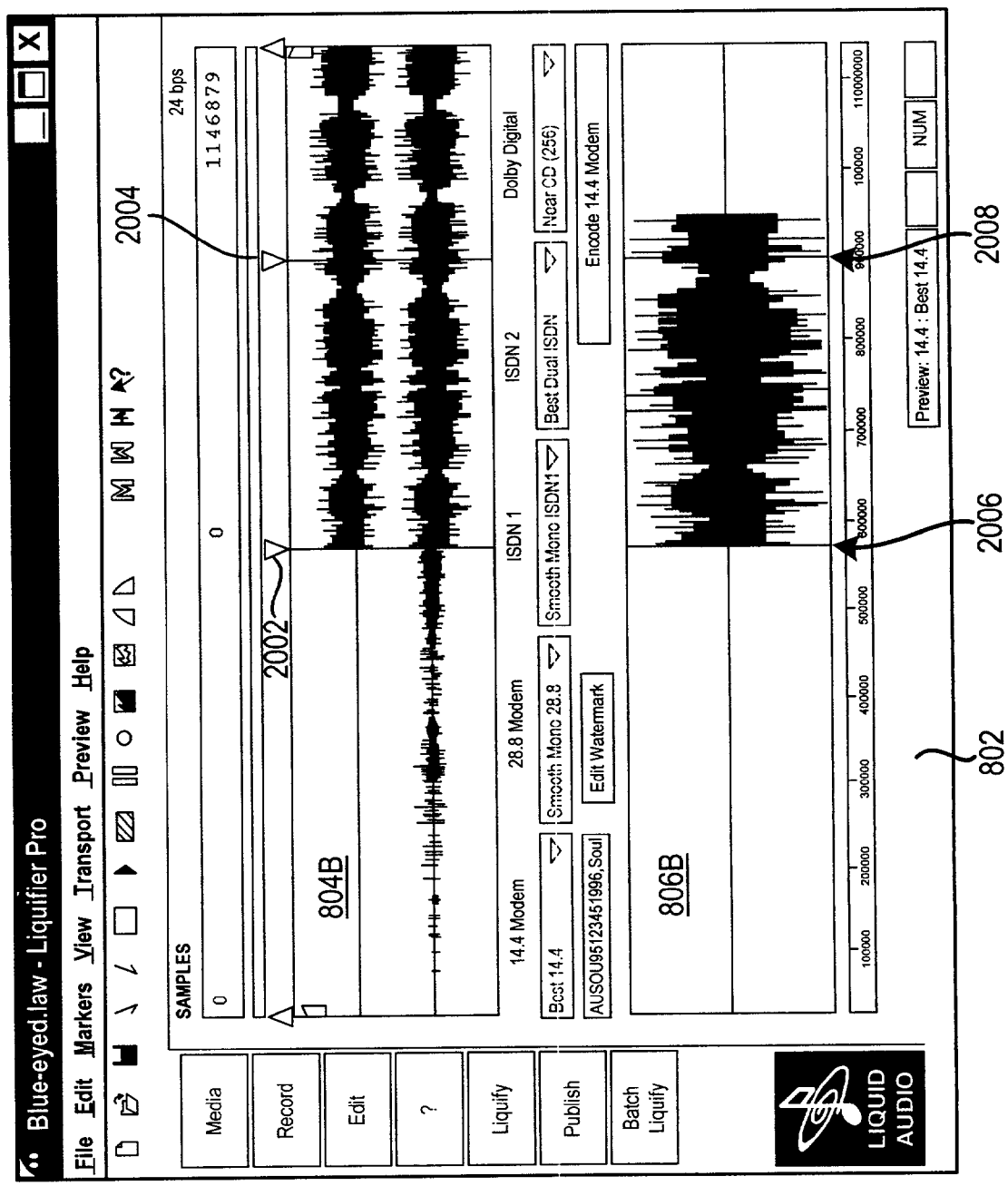
FIG. 20 is a second screen view of a preview pane of the audio signal processor of FIG. 1.

GUI 112 permits the user to specify a small portion of the audio signal of source audio file 102 for processing to thereby sample audio signals produced by processing according to various processing parameters as stored in audio processing profiles such as audio processing profile 304A (FIG. 4). Specifically, the user specifies a beginning time 2002 (FIG. 20) and an ending time 2004 in representation 804B of the audio signal of source audio file 102 (FIG. 1). Processing of the audio signal of source audio file 102 by processing pipeline 114 begins with a starting sample 2006 (FIG. 20) at beginning time 2002 and ends with an ending sample 2008 at ending time 2004. Accordingly, the user focuses attention to a particular portion the audio signal of source audio file 102 (FIG. 1) and avoids previewing preludes or other portions of encoded audio signals which are of relatively little interest to the user, thereby expediting the preview of encoded audio signals in the manner described above. In addition, the time required to produce encoded audio signals in accordance with each iterative change of processing parameters in the manner described above is significantly reduced since less of the audio signal of source audio file 102 is processed. Previewing is therefore further expedited.

Figure 2:
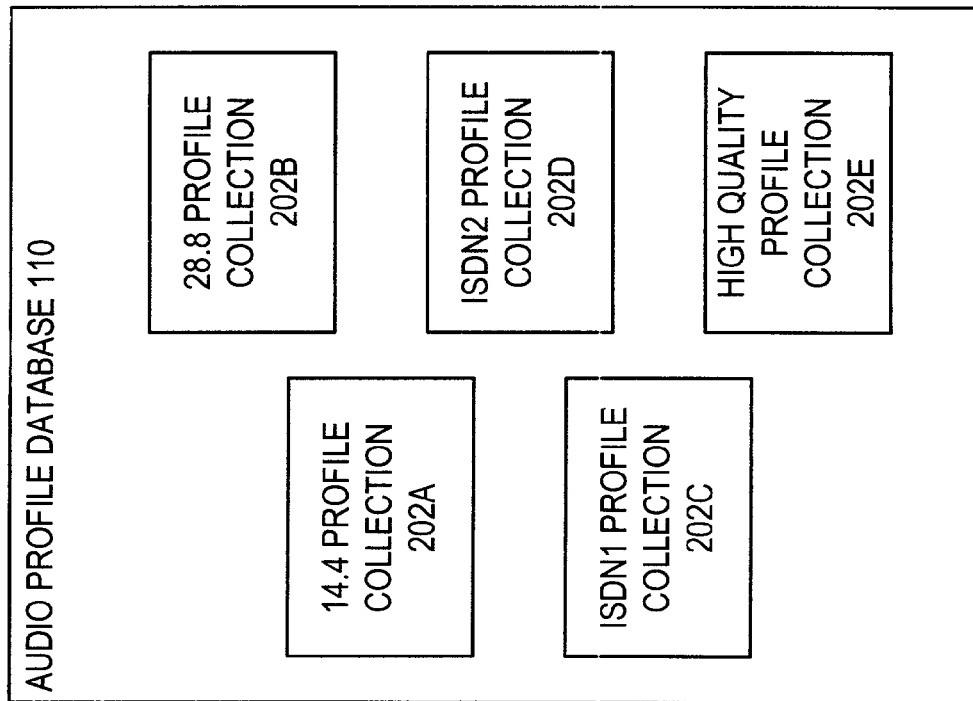
FIG. 2 is a block diagram of an audio profile database of the audio signal processor of FIG. 1.

In addition, the user can specify that a selected clip forms the entirety of the content to be encoded for a particular delivery bandwidth. As described above, each of profile collections 202A–E corresponds to a particular delivery bandwidth. Accordingly, the user can associate a selected clip with each of profile collections 202A–E. Specifically, in this illustrative embodiment, the user specifies a portion of content 902 (FIG. 9) as a song and a sub-portion thereof as a clip. The distinction between songs and clips is described more completely below. For the particular bandwidth associated with profile collection 202A, a song flag 306 and a clip flag 308 store data indicating whether a song or a clip of content 902 (FIG. 9), respectively, is made available to customers through the delivery bandwidth associated with profile collection 202A. In an alternative embodiment, the user can associate a selected clip with each audio processing profile, e.g., each of audio processing profiles 304A–E (FIG. 3) and each audio processing profile of profile collections 202B–E (FIG. 2). In another embodiment, clips are defined by the user and are used globally for all audio processing profiles. In this last illustrative embodiment, the user can specify that either a song or clip or both can be delivered through a particular delivery bandwidth. Songs and clips are described in more detail below.

In general, audio encoded by audio signal processor 100 (FIG. 1) is delivered in the following manner to a remote computer system operated by a human customer. The customer requests a preview of a piece of audio. In response to the request, a server computer system streams a selected one of encoded audio signals 106A–E to the remote computer system. The selected encoded audio signal is selected according to the delivery bandwidth by which the remote computer system is coupled to the wide area network through which the server computer system delivers the encoded audio signal. In one embodiment, the customer specifies the delivery bandwidth during a customer registration/initialization process. By streaming the preview audio, the customer doesn't have to wait an inordinate amount of time to sample the audio content (e.g., music) by downloading and subsequent decoding and playback. Accordingly, the customer can more quickly browse and sample various audio signals of a large collection. If the customer elects to purchase the previewed audio, the one of encoded audio signals 106A–E corresponding to high quality profile collection 202E is sent by the server computer system for downloading to the remote computer. The act of purchasing by the customer is less time intensive that browsing, since the customer presumably wants very high quality audio and is willing to wait when paying for the audio. By contrast, during preview to browse a large collection of audio content, the customer presumably prefers expeditious browsing to maximized quality of the sampled audio signals.

Allowing the user to specify clips for each delivery bandwidth has a number of advantages. First, the user can select a relatively small portion of content 902 (FIG. 9) for preview by customers. First, content 902 may have a length introduction which would prevent a customer from quickly previewing the essence of content 902. Second, allowing the customer to preview all of content 902 can diminish the commercial value of a higher quality purchased encoding of content 902 by providing a free, albeit lower quality, alternative. Accordingly, profile collection 202A (FIG. 3) includes a download enabled flag 310 which stores data indicating whether a customer is to be permitted to download audio associated with profile collection 202A. Profile collection 202A further includes a paid flag 312 which stores data indicating whether a customer is required to pay for downloaded audio associated with profile collection 202A. The user of audio signal processor 100 (FIG. 1) specifies the data stored in download enabled flag 310 (FIG. 3) and paid flag 312 using conventional graphical user interface techniques.

As used herein, a song is generally that portion of an audio signal which is commercially sold, and a clip is generally any other portion of the audio signal. Typically, a song is the entirety of an audio signal, and a clip is a subset thereof. Clips are defined in header 108 (FIG. 1) which is shown in greater detail in FIG. 10.

Header 108 includes a current position field 1002; an ending position 1004; one or more mark fields, including mark field 1006; and one or more fade fields, including fade field 1008. Current position field 1002 contains data representing a relative time in the playback of the audio content represented in any of encoded audio signals 106A–E (FIG. 1). End position 1004 (FIG. 10) contains data representing an ending time in the playback of the audio content represented in any of encoded audio signals 106A–E (FIG. 1). Accordingly, encoded audio signals 106A–E have a common playback state. Relative times specified in current position field 1002 (FIG. 10) and ending position 1004 identify specific respective samples in each of encoded audio signals 106A–E (FIG. 1) by use of the sampling rate of each encoded audio signal. For example, the sampling rate of encoded audio signal 106A is specified in sample rate field 404A (FIG. 4) of audio processing profile 304A.

Mark field 1006 (FIG. 10) represents the bounds of a song or clip and is shown in greater detail in FIG. 21. Mark field 1006 includes a song/clip field 2102, a start position field 2104, and a stop position field 2106. Song/clip field 2102 contains data indicating whether mark 1006 represents a song or a clip. From the perspective of audio signal processor 100 (FIG. 1), the distinction is meaningless. The distinction is becomes important in the context of delivery of encoded audio signal 106A. Start position field 2104 and stop position field 2106 contain data defining first and last samples, respectively, of the portion of any of encoded audio signals 106A–E (FIG. 1) represented by mark field 1006 (FIG. 10).

Each of the one or more fade fields of header 108 corresponds to a respective one of the one or more mark fields of header 108 and specifies fade-in and fade-out times for the respective mark field. For example, fade field 1008 corresponds to mark field 1006 and specifies fade-in and fade-out times for the song or clip represented by mark field 1006. Specifically, fade field 1008 includes a fade-in field 2202 (FIG. 22) and a fade-out field 2204 which contain data representing fade-in and fade-out times, respectively, for the song or clip represented by mark field 1006 (FIG. 10). Thus, fade field 1008 and mark field 1006 can collectively specify a clip of content 902 which a customer can preview.

Figure 9:
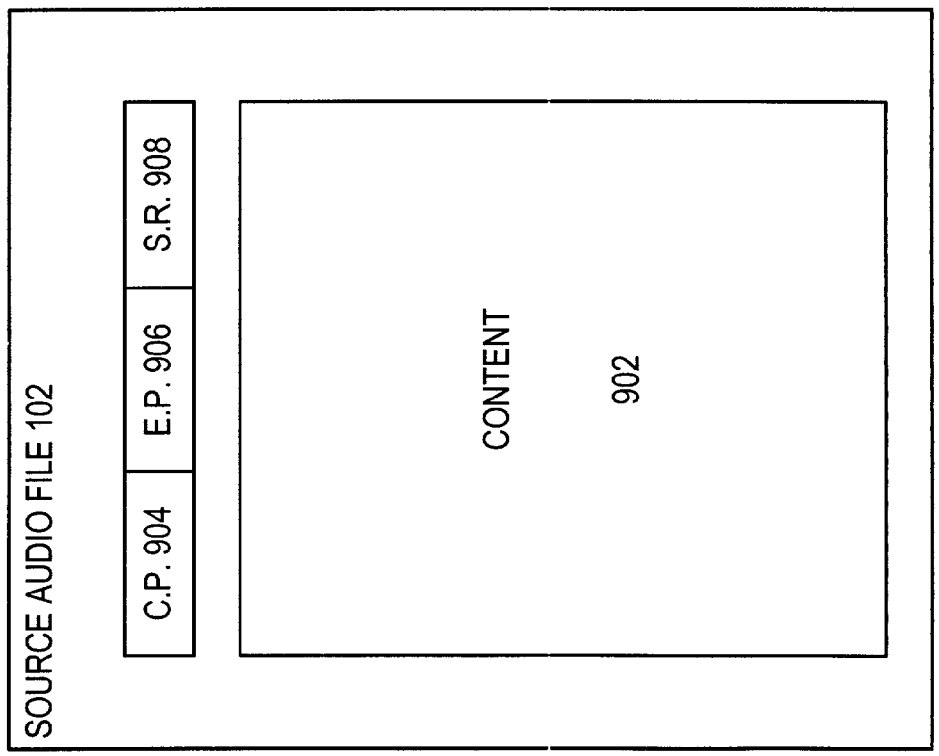
FIG. 9 is a block diagram of the source audio file processed by the audio signal processor of FIG. 1.

The user can specify fade-in and fade-out times using any of a number of graphical user interface techniques. For example, the user can type fade-in and fade-out times using a keyboard. Alternatively, the user can specify fade-in and fade-out times in the manner the user specifies beginning time 2002 (FIG. 20) and ending time 2004 as described above. When playing back a clip selected by the user in the manner described above with respect to FIG. 20, any fades specified by the user are incorporated into the playback so that the user can hear precisely the sample which can ultimately be delivered to customers as a sample of content 902 (FIG. 9).

In addition to the advantages described above with respect to defining clips and songs for the same underlying audio content, significant space can be save in representing encoded audio signals 106A–E. Specifically, if song flag 308 stores data indicating that no song is available for the delivery bandwidth associated with profile collection 202A, encoded audio signal 106A (FIG. 1), which corresponds to profile collection 202A (FIG. 3) as described above, only includes audio content corresponding to the clip associated with profile collection 202A. Audio content included in the song but not included in the clip is omitted from encoded audio signal 106A and space is therefore conserved. The amount of space conserved depends upon the difference in size of the clip and song and in the audio signal corresponding to content of the song excluded from the clip. In certain circumstances, the amount of space saved can be substantial.

The above description is illustrative only and is not limiting. The present invention is limited only by the claims which follow.

What is claimed is:

1. A method for processing an audio signal to produce an encoded audio signal for subsequent decoding and playback of the audio signal, the method comprising:
    storing audio signal processing data in a memory of a computer;
    retrieving format data from the audio processing data;
    producing a format intermediate audio signal from the audio signal in accordance with the retrieved format data;
    retrieving sample rate data from the signal processing data;
    producing a sample rate converted intermediate audio signal from the format intermediate audio signal in accordance with the sample rate data;
    retrieving filtering data from the signal processing data;
    producing a filtered intermediate audio signal from the sample rate converted intermediate audio signal in accordance with the filtering data;
    retrieving encoding data from the signal processing data;
    producing the encoded audio signal from the filtered intermediate audio signal in accordance with the encoding data.

2. The method of claim 1 wherein the step of producing a filtered intermediate audio signal comprises:
    filtering the sample rate converted intermediate audio signal using one or more equalization filters, each of which is selected from the group consisting of low shelf, band pass, and high shelf filters and each of which is defined by the filtering data.

3. The method of claim 1 wherein the step of producing a filtered intermediate audio signal comprises:
    filtering the sample rate converted intermediate audio signal using one or more dynamic filters, each of which is selected from the group consisting of expander, compressor, and limiter filters and each of which is defined by the filtering data.

4. The method of claim 1 wherein the step of storing comprises the step of:
    storing the audio signal processing data as an audio processing profile in a database which includes one or more other audio processing profiles and which is stored in the memory.

5. A computer readable medium useful in association with a computer which includes a processor and a memory, the computer readable medium including computer instructions which are configured to cause the computer to process an audio signal to produce an encoded audio signal for subsequent decoding and playback of the audio signal by performing the steps of:
    storing audio signal processing data in a memory of a computer;
    retrieving format data from the audio processing data;
    producing a format intermediate audio signal from the audio signal in accordance with the retrieved format data;
    retrieving sample rate data from the signal processing data;
    producing a sample rate converted intermediate audio signal from the format intermediate audio signal in accordance with the sample rate data;
    retrieving filtering data from the signal processing data;
    producing a filtered intermediate audio signal from the sample rate converted intermediate audio signal in accordance with the filtering data;
    retrieving encoding data from the signal processing data;
    producing the encoded audio signal from the filtered intermediate audio signal in accordance with the encoding data.

6. The computer readable medium of claim 5 wherein the step of producing a filtered intermediate audio signal comprises:
    filtering the sample rate converted intermediate audio signal using one or more equalization filters, each of which is selected from the group consisting of low shelf, band pass, and high shelf filters and each of which is defined by the filtering data.

7. The computer readable medium of claim 5 wherein the step of producing a filtered intermediate audio signal comprises:
    filtering the sample rate converted intermediate audio signal using one or more dynamic filters, each of which is selected from the group consisting of expander, compressor, and limiter filters and each of which is defined by the filtering data.

8. The computer readable medium of claim 5 wherein the step of storing comprises the step of:

storing the audio signal processing data as an audio processing profile in a database which includes one or more other audio processing profiles and which is stored in the memory.

9. A computer system comprising:

a processor;

a memory operatively coupled to the processor; and an audio signal processor which executes in the processor from the memory and which, when executed by the processor, causes the computer to process an audio signal to produce an encoded audio signal for subsequent decoding and playback of the audio signal by performing the steps of:

storing audio signal processing data in a memory of a computer;

retrieving format data from the audio processing data;

producing a format intermediate audio signal from the audio signal in accordance with the retrieved format data;

retrieving sample rate data from the signal processing data;

producing a sample rate converted intermediate audio signal from the format intermediate audio signal in accordance with the sample rate data;

retrieving filtering data from the signal processing data;

producing a filtered intermediate audio signal from the sample rate converted intermediate audio signal in accordance with the filtering data;

retrieving encoding data from the signal processing data;

producing the encoded audio signal from the filtered intermediate audio signal in accordance with the encoding data.

10. The computer system of claim 9 wherein the step of producing a filtered intermediate audio signal comprises:

filtering the sample rate converted intermediate audio signal using one or more equalization filters, each of which is selected from the group consisting of low shelf, band pass, and high shelf filters and each of which is defined by the filtering data.

11. The computer system of claim 9 wherein the step of producing a filtered intermediate audio signal comprises:

filtering the sample rate converted intermediate audio signal using one or more dynamic filters, each of which is selected from the group consisting of expander, compressor, and limiter filters and each of which is defined by the filtering data.

12. The computer system of claim 9 wherein the step of storing comprises the step of:

storing the audio signal processing data as an audio processing profile in a database which includes one or more other audio processing profiles and which is stored in the memory.

* * * * *

UNITED STATES PATENT AND TRADEMARK OFFICE
CERTIFICATE OF CORRECTION

PATENT NO. : 7,016,746 B2  
APPLICATION NO. : 10/147746  
DATED : March 21, 2006  
INVENTOR(S) : Philip R. Wiser et al.

Page 1 of 1

It is certified that error appears in the above-identified patent and that said Letters Patent is hereby corrected as shown below:

In column 7, line 51, delete "preforms" and insert -- performs --, therefor.

In column 7, line 58, after "conversion" delete "an" and insert -- and --, therefor.

In column 13, line(s) 50-51, delete "single channel" and insert -- single-channel --, therefor.

In column 14, line 57, delete "source-audio" and insert -- source audio --, therefor.

In column 15, line 63, delete "086." and insert -- 806. --, therefor.

In column 17, line 3, delete "correspond" and insert -- corresponds --, therefor.

Signed and Sealed this

Eighteenth Day of August, 2009

David J. Kappos
*Director of the United States Patent and Trademark Office*